(12) United States Patent
Katsumata et al.

(10) Patent No.: US 10,511,767 B2
(45) Date of Patent: Dec. 17, 2019

(54) INFORMATION PROCESSING DEVICE, INFORMATION PROCESSING METHOD, AND PROGRAM

(71) Applicants: SONY CORPORATION, Tokyo (JP); SONY INTERACTIVE ENTERTAINMENT INC., Tokyo (JP)

(72) Inventors: Mitsuru Katsumata, Tokyo (JP); Takayuki Shinohara, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 12 days.

(21) Appl. No.: 15/742,137

(22) PCT Filed: Jun. 27, 2016

(86) PCT No.: PCT/JP2016/069008
§ 371 (c)(1),
(2) Date: Jan. 5, 2018

(87) PCT Pub. No.: WO2017/022363
PCT Pub. Date: Feb. 9, 2017

(65) Prior Publication Data
US 2018/0198979 A1    Jul. 12, 2018

(30) Foreign Application Priority Data
Aug. 5, 2015    (JP) .................................. 2015-155239

(51) Int. Cl.
*H04N 5/232*    (2006.01)
*G06T 5/00*    (2006.01)
(Continued)

(52) U.S. Cl.
CPC ........... *H04N 5/23238* (2013.01); *G06T 5/00* (2013.01); *G09G 5/00* (2013.01); *G09G 5/003* (2013.01);
(Continued)

(58) Field of Classification Search
CPC .................................... G06T 5/00; G09G 5/00
See application file for complete search history.

(56) References Cited

U.S. PATENT DOCUMENTS

2005/0024532 A1    2/2005  Choi
2015/0124049 A1*   5/2015  Kimura .................. G03B 37/00
                                                    348/39

FOREIGN PATENT DOCUMENTS

EP              2523461 A1    11/2012
JP          2006-180022 A      7/2006
(Continued)

OTHER PUBLICATIONS

Nov. 23, 2018, European Search Report issued for related EP Application No. 16832642.9.

*Primary Examiner* — Thai Q Tran
*Assistant Examiner* — Girumsew Wendmagegn
(74) *Attorney, Agent, or Firm* — Paratus Law Group, PLLC

(57) ABSTRACT

In an information processing device including a display unit that is able to selectively display a multi-directional video and a data processing unit that executes video display control, the data processing unit applies a device-correspondent video display scheme recorded in video display control information and executes the video display process. The video display control information defines a type-based display scheme optimum for each type of information processing device executing a video display process. The data processing unit applies the display scheme associated with a
(Continued)

type matching the type of the own device and executes the video display process.

15 Claims, 21 Drawing Sheets

(51) Int. Cl.
*G09G 5/00* (2006.01)
*H04N 5/225* (2006.01)
*H04N 21/218* (2011.01)
*H04N 21/81* (2011.01)

(52) U.S. Cl.
CPC ............. *H04N 5/225* (2013.01); *H04N 5/232* (2013.01); *H04N 21/21805* (2013.01); *H04N 21/816* (2013.01); *G09G 2320/068* (2013.01); *G09G 2320/0613* (2013.01); *G09G 2360/02* (2013.01)

(56) References Cited

FOREIGN PATENT DOCUMENTS

| | | |
|---|---|---|
| JP | 2010-062695 A | 3/2010 |
| JP | 2011-091481 A | 5/2011 |
| JP | 2011-254239 A | 12/2011 |
| JP | 2014-127001 A | 7/2014 |
| WO | WO 02/097584 A2 | 12/2002 |
| WO | WO 2013/183346 A1 | 12/2013 |
| WO | WO 2014/176898 A1 | 11/2014 |

* cited by examiner

FIG. 7

```
aligned(8) class ProjectionType extends FullBox('PJTT') {
    unsigned int(8) device_count;                              — 91  NUMBER OF DEVICE DIVISIONS
                                                                      (NUMBER OF LOOPS)
                                                                      (device_count)
    for (i=1 ; i<= device_count; i++){
        unsigned int(7) device_type;                           — 92  DEVICE TYPE WHICH IS DISPLAY SCHEME
                                                                      DESIGNATION TARGET (device_type)
        unsigned int(1) user_selection_flag;                   — 94  DESIGNATION DISPLAY SCHEME
        unsigned int(8) default_projection_type;                      (projection_type)
        unsigned int(8) default_diagonal_angle;
        if(user_selection_flag){                               — 90  DEVICE TYPE-BASED
                                                                      DESIGNATION
                                                                      INFORMATION
            unsigned int(8) user_selection_type_num;
            for(j=1 ; j<= user_selection_type_num; j++){
                unsigned int(8) user_projection_type;
                unsigned int(8) user_diagonal_angle;           — 96  USER SELECTION
                                                                      PERMISSION
                                                                      INFORMATION
            }                                                  — 98  USER SELECTABLE
        }                                                            DISPLAY REGION DIAGONAL ANGLE
    }                                                                 (user_diagonal_angle)
}
```

93 — USER SELECTION PERMISSION FLAG (user_selection_flag)

95 — DISPLAY REGION DIAGONAL ANGLE (diagonal_angle)

97 — USER SELECTABLE DISPLAY SCHEME (user_projection_type)

FIG. 8

| (1) VALUES OF DEVICE TYPES (device_type) | | (2) DESIGNATED AVAILABLE DEVICES |
|---|---|---|
| (a) | 0 | NO DEVICE DESIGNATION: AVAILABLE IN ALL DEVICES (IN CASE IN WHICH ANOTHER VALUE OTHER THAN 0 IS WRITTEN TOGETHER, AVAILABLE IN DEVICES OTHER THAN DEVICE CORRESPONDING TO SETTING VALUE WRITTEN TOGETHER) |
| (b) | 1 | IMMERSIVE-TYPE HEAD-MOUNTED DISPLAY (HMD) [HMD WITH WHICH ONLY DISPLAY VIDEO OF HMD DISPLAY UNIT CAN BE OBSERVED] |
| (c) | 2 | GLASSES-TYPE HEAD-MOUNTED DISPLAY (HMD) [HMD WITH WHICH NOT ONLY DISPLAY VIDEO OF HMD DISPLAY UNIT BUT ALSO OUTSIDE SCENERY TRANSMITTED THROUGH HMD CAN BE OBSERVED] |
| (d) | 3 | USER-SCREEN-MANIPULATION-TYPE DEVICE WITH WHICH VIDEO CAN BE MOVED BY SCREEN MANIPULATION (MOUSE, TOUCH MANIPULATION, ETC.) BY USER [PC, TABLET TERMINAL, PORTABLE TERMINAL, ETC.] |
| (e) | 4 | USER-MOTION-MANIPULATION-TYPE DEVICE IN WHICH VIDEO CAN BE MOVED BY DEVICE MOVEMENT MANIPULATION (MOTION MANIPULATION OF SHAKING DEVICE, ETC) BY USER [TABLET TERMINAL, PORTABLE TERMINAL, ETC.] |

FIG. 9

| (1) VALUES OF DISPLAY SCHEMES (projection_type) | (2) DESIGNATED DISPLAY SCHEMES |
|---|---|
| (a) 0 | NO DESIGNATION: DISPLAY SCHEME DECIDED IN INFORMATION PROCESSING DEVICE (DISPLAY DEVICE) SIDE |
| (b) 1 | VIDEO IS DISPLAYED WITHOUT CHANGE (NO CONVERSION PROCESS IS EXECUTED) |
| (c) 2 | PERSPECTIVE SCHEME |
| (d) 3 | 360° VIDEO WHOLE DISPLAY SCHEME USING TWO FISH EYES |
| (e) 4 | FISH EYE (WIDE ANGLE) DISPLAY SCHEME [=Stereographic DISPLAY SCHEME] |
| (f) 5 | FISH EYE (WIDE ANGLE) DISPLAY SCHEME [= Equidistant DISPLAY SCHEME] |
| (g) 6 | FISH EYE (WIDE ANGLE) DISPLAY SCHEME [= Equisolid angle DISPLAY SCHEME] |
| (h) 7 | FISH EYE (WIDE ANGLE) DISPLAY SCHEME [= Orthographic DISPLAY SCHEME] |

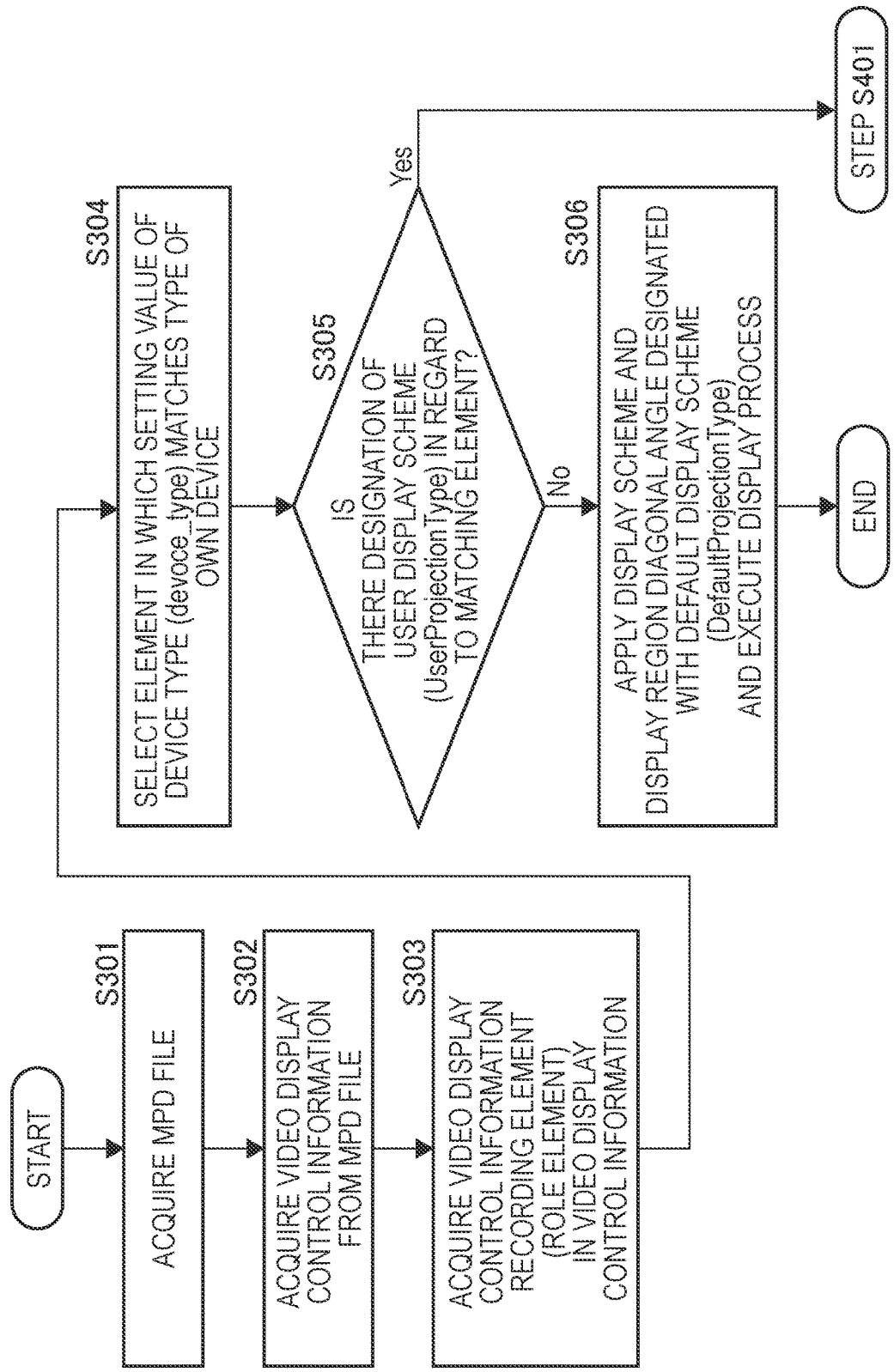

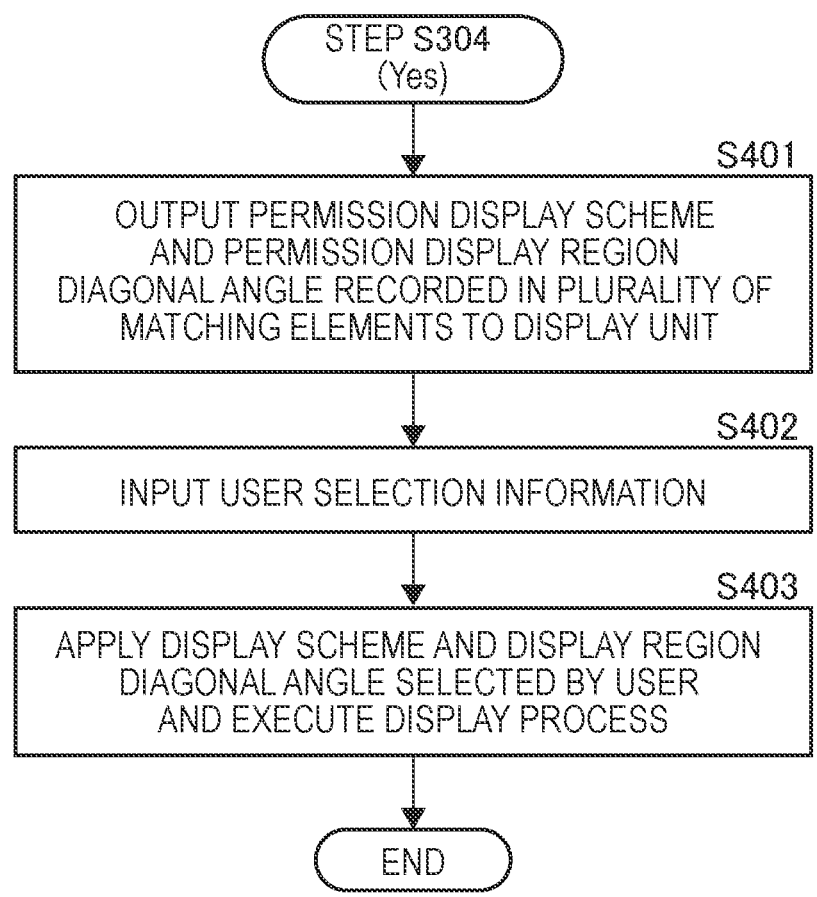

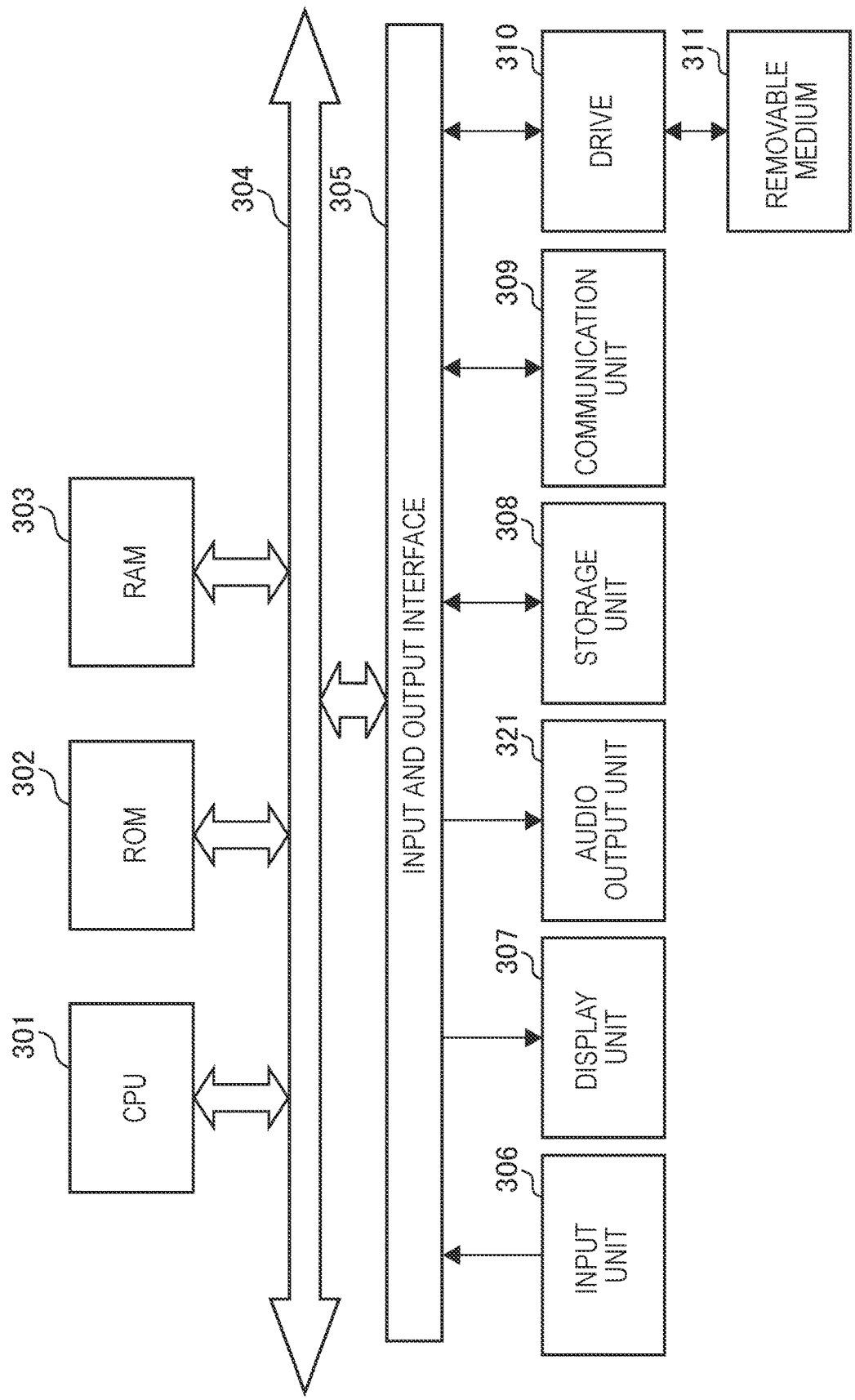

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/069008 (filed on Jun. 27, 2016) under 35 U.S.C. § 371, which claims priority to Japanese Patent Application No. 2015-155239 (filed on Aug. 5, 2015), which are all hereby incorporated by reference in their entirety.

TECHNICAL FIELD

The present disclosure relates to an information processing device, an information processing method, and a program, and more particularly, to an information processing device, an information processing method, and a program capable of displaying a display scheme of a video to be displayed on a display unit in accordance with an optimum scheme, for example, a display scheme recommended by a content maker, in a video display configuration in which a multi-directional video such as a celestial video, an omni-directional video, or a panorama video can be observed.

BACKGROUND ART

In recent years, imaging devices capable of shooting multi-directional videos such as celestial videos, omnidirectional videos, or panorama videos have been developed. Systems in which videos shot using such imaging devices are displayed on display units of PCs, tablet terminals, portable terminals, head-mounted displays (HMDs), or the like and videos selected by users or videos automatically selected in accordance with directions of users can be observed have been widely used.

For example, in PCs or the like, picture (moving video) data of peripheral 360° omnidirectional videos can be acquired from external servers or can be read from recording media to be displayed on display devices. Users can select videos of any direction and display the videos on display devices, can change viewpoints freely, and can observe videos such as moving videos, still images, or the like.

Videos displayed on display units of PCs, tablet terminals, or portable terminals can be displayed by moving observation directions by mouse manipulations or sliding processes, flicking processes, or the like on touch panels by users so that the users can easily enjoy multi-directional videos.

In a case in which videos are displayed on head-mounted displays (HMDs), videos in accordance with directions of the heads of users can be displayed in accordance with information of sensors which are mounted on the HMDs and detect motions or directions of the heads. Thus, the users can experience a sensation as if the users were in the videos displayed on display units of the HMDs.

The celestial videos, the omnidirectional videos, or the panorama videos are subjected to a process of cutting only partial videos from the shot multi-directional videos and displaying the partial videos on display units of display devices.

There are a plurality of different schemes of a display process involving the video cutting.

For example, there are a perspective scheme, a fish eye (wide angle) display scheme, and the like.

Also, as a technology of the related art in which a process of changing a display range through video processing is disclosed, there is Patent Literature 1 (JP 2014-127001A).

In general, applications (programs) executing predetermined display schemes are stored in display devices, for example, display devices of PCs, portable terminals, HMDs, or the like, and display processes are executed in accordance with display schemes selected in accordance with the applications (apps).

However, the display scheme selected by each of the apps does not necessarily match an intention of a content maker, that is, a display scheme realizing a video that appears as the content maker intended.

When video display is executed using a display scheme different from a display scheme assumed by the content maker, a problem that a user (observer) cannot view a "video that appears as intended" by the content maker occurs.

CITATION LIST

Patent Literature

Patent Literature 1: JP 2014-127001A

DISCLOSURE OF INVENTION

Technical Problem

The present disclosure was finalized in view of, for example, the foregoing problem and provides an information processing device, an information processing method, and a program capable of selecting and executing an optimum display scheme, for example, a display scheme of displaying a video that appears as a content maker intended, in a video display device that outputs a multi-directional video such as an omnidirectional video in response to a manipulation or an operation by a user.

Solution to Problem

A first aspect of the present disclosure is an information processing device including: a display unit configured to be able to selectively display a multi-directional video; and a data processing unit configured to execute video display control on a video to be output to the display unit. The data processing unit acquires video display control information regarding output video data, applies a video display scheme recorded in the video display control information, and executes a video display process.

Further, a second aspect of the present disclosure is a data delivery server including: a data processing unit configured to generate a file that stores video data configured so that a multi-directional video is selectably displayable and video display control information which is video display control information regarding the video data and defines a video display scheme in accordance with a device type that executes video display; and a communication unit configured to transmit the file generated by the data processing unit.

Further, a third aspect of the present disclosure is an information recording medium storing video data configured so that a multi-directional video is selectably displayable, and video display control information which is video display control information regarding the video data and defines a video display scheme in accordance with a device type that executes video display. The information recording medium is configured to be able to cause a reproduction device that reproduces data read from the information recording medium to apply the video display scheme corresponding to the device type matching the type of the own device recorded in the video display control information and execute the video display.

Further, a fourth aspect of the present disclosure is an information processing method of executing video display control in an information processing device. The information processing device includes a display unit configured to be able to selectively display a multi-directional video, and a data processing unit configured to execute the video display control on a video to be output to the display unit, and the data processing unit acquires video display control information regarding output video data, applies a video display scheme recorded in the video display control information, and executes a video display process.

Further, a fifth aspect of the present disclosure is a program causing an information processing device to execute video display control. The information processing device includes a display unit configured to be able to selectively display a multi-directional video, and a data processing unit configured to execute the video display control on a video to be output to the display unit, and the program causes the data processing unit to acquire video display control information regarding output video data, apply a video display scheme recorded in the video display control information, and execute a video display process.

Note that a program according to the present disclosure is, for example, a program provided in computer-readable format to an information processing device or a computer system capable of executing various program code, the program being providable by a storage medium or communication medium. By providing such a program in a computer-readable format, processing corresponding to the program is realized on the information processing device or the computer system.

Further objectives, features, and advantages of the present disclosure will be clarified by a more detailed description based on the embodiments of the present disclosure described hereinafter and the attached drawings. Note that in this specification, the term "system" refers to a logical aggregate configuration of multiple devices, and the respective devices of the configuration are not limited to being inside the same housing.

Advantageous Effects of Invention

In a configuration according to an embodiment of the present disclosure, it is possible to realize a device and a method capable of applying an optimum display scheme corresponding to a display device and executing a display process at the time of a panorama video display process.

Specifically, in an information processing device including a display unit that is able to selectively display a multi-directional video and a data processing unit that executes video display control, the data processing unit applies a device-correspondent video display scheme recorded in video display control information and executes the video display process. The video display control information defines a type-based display scheme optimum for each type of information processing device executing a video display process. The data processing unit applies the display scheme associated with a type matching the type of the own device and executes the video display process.

With this configuration, it is possible to realize a device and a method capable of applying an optimum display scheme corresponding to a display device and executing a display process at the time of a panorama video display process.

Note that the advantageous effects described in this specification are merely for the sake of example and non-limiting, and there may be additional advantageous effects.

BRIEF DESCRIPTION OF DRAWINGS

FIG. 7 is an explanatory diagram illustrating a recording example of video display control information in an MP4 file.

FIG. 8 is an explanatory diagram illustrating a device type setting example.

FIG. 9 is an explanatory diagram illustrating a display scheme setting example.

FIG. 19 is a diagram illustrating an explanatory flowchart of an execution sequence of reading of video display control information from an MPD file and a video display control process.

FIG. 20 is a diagram illustrating an explanatory flowchart of an execution sequence of reading of video display control information from an MPD file and a video display control process.

FIG. 21 is an explanatory diagram illustrating a hardware configuration example of an information processing device.

MODE(S) FOR CARRYING OUT THE INVENTION

Figure 1:
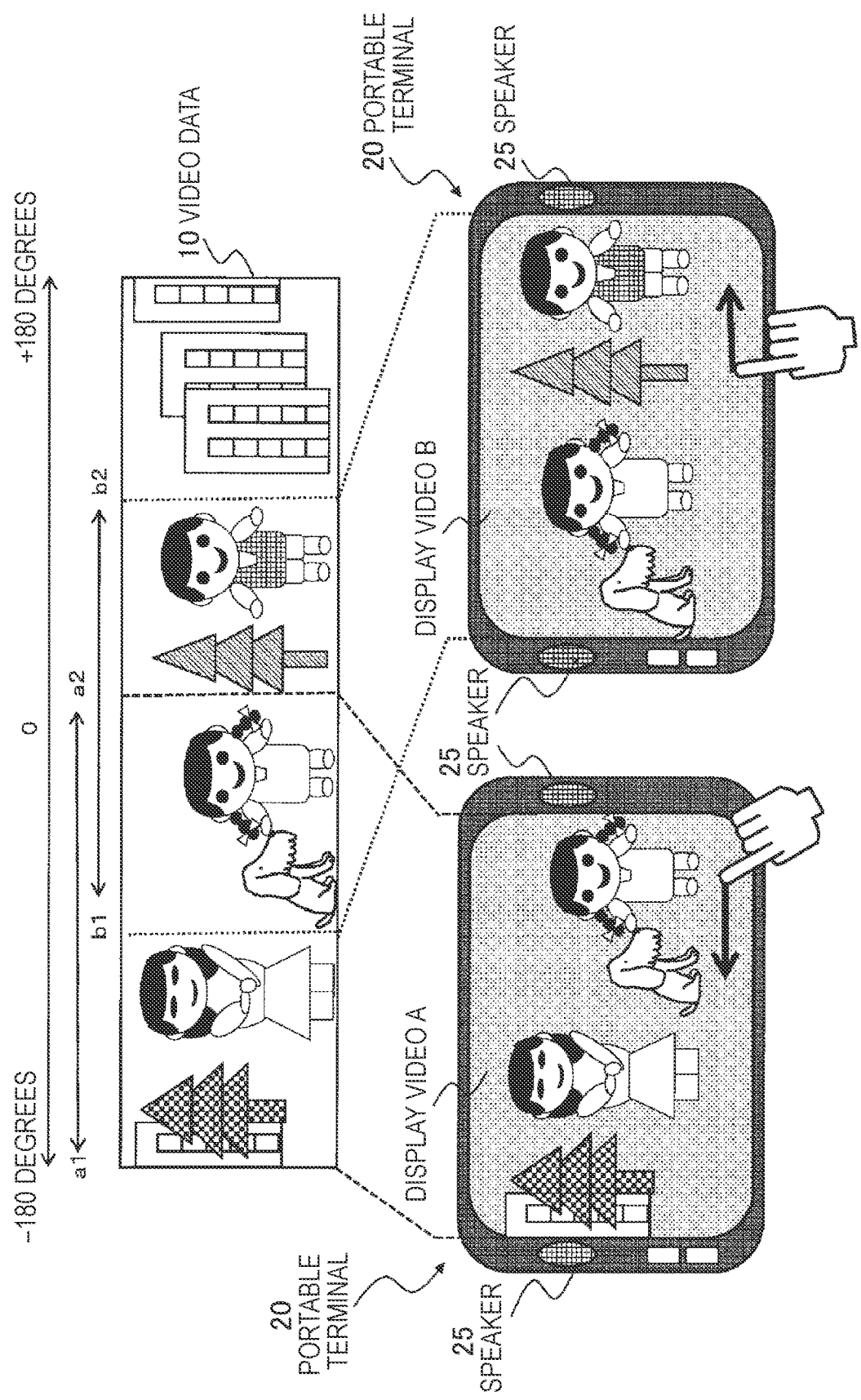
FIG. 1 is an explanatory diagram illustrating examples of a video display process and an audio output process in an information processing device.

Hereinafter, the details of an information processing device, an information processing method, and a program of the present disclosure will be described with reference to the drawings. Note that the following items will be described.

1. Overview of video display process
2. Overview of configuration in which designated video display scheme is selected and video display process is executed
3. (First embodiment) Embodiment in which video display scheme to be used in device is defined in MP4 file
3-1. (First video display control information recording example) Recording example in which display scheme designation information is recorded in units of content in MP4 file
3-2. (Second video display control information recording example) Recording example in which display scheme designation information is recorded in units of display devices in MP4 file
3-3. (Third video display control information recording example) Recording example in which display scheme designation information for restricting scheme which can be selected by user is recorded in MP4 file
4. Video display control process sequence in which video display control information recorded in MP4 file is used
5. (Second embodiment) Embodiment in which video display control information is recorded in MPD
6. Video display control process sequence in which video display control information recorded in MPD file is used
7. Hardware configuration example of information processing device
8. Summary of configuration of present disclosure

[1. Overview of Video Display Process]

First, an overview of a video display process in a device capable of displaying a multi-directional video such as a celestial video, an omnidirectional video, or a panorama video on a display unit will be described with reference to FIG. 1 and the subsequent drawings.

As described above, in recent years, imaging devices capable of shooting multi-directional videos such as celestial videos, omnidirectional videos, or panorama videos have been developed. Systems in which videos shot using such imaging devices are displayed on display units of PCs, tablet terminals, portable terminals, head-mounted displays (HMDs), or the like and videos of any direction selected by users can be observed have widely been used.

For example, picture (moving video) data of peripheral 360° omnidirectional videos can be acquired from an external server or can be read from recording media to be displayed on display devices of PCs or the like of users. The users can select videos of any direction from the video data acquired from the servers or the recording media, display the videos on the display devices, and observe pictures (moving videos) or still images while freely changing viewpoints.

FIG. 1 is an explanatory diagram illustrating an example in which multi-directional videos are selected and displayed on a display unit of a portable terminal.

Video data 10 illustrated in FIG. 1 is a panorama video. A video of 360° in horizontal directions is set as one piece of video data.

When a middle portion of the video data is assumed to be a video in the front direction (for example, 0 degrees=north) of a user (an observer), a left end of the video data 10 is a video in the rear direction (−180 degrees=south) of the user (the observer) and a right end of the video data 10 is also a video in the rear direction (+180 degrees=south) of the user (the observer).

The left and right ends of the video data 10 are the videos at the same position.

Also, in a case of a celestial video or an omnidirectional video, that is, a 360° panorama video, 180° videos are shot in regard to the vertical direction and videos in all the vertical and horizontal directions are included.

In the following embodiments, an example in which a 360° panorama video in the horizontal directions is used will be described. However, the configuration according to the present disclosure can also be applied in a case in which a celestial video or an omnidirectional video is used. The configuration of the present disclosure can be applied to a device in which multi-directional videos can be selectively displayed.

A panorama video in the following description is assumed to include a 360° panorama video in the horizontal directions, a 360° panorama video such as a celestial video or an omnidirectional video, and all the videos in which multi-directional videos can be displayed by video movement.

In the lower part of FIG. 1, a portable terminal 20 which is an example of an information processing device of a user is illustrated.

A video in a region of a part of the video data 10, for example, a video in any region selected by the user, can be displayed on a display unit of the portable terminal 20.

A display video A on the portable terminal 20 on the left side is a region video of a partial section of a video section a1 to a2 of a partial region in the video data 10.

A display video B on the portable terminal 20 on the right side is a region video of a partial section of a video section b1 to b2 of a partial region in the video data 10.

The user can display a video of any region by moving the display video through a sliding process or the like with his or her finger on the display unit configured as a touch panel.

Also, the portable terminal 20 includes a speaker 25 so that audio data recorded together in the display video can be output.

Figure 2:
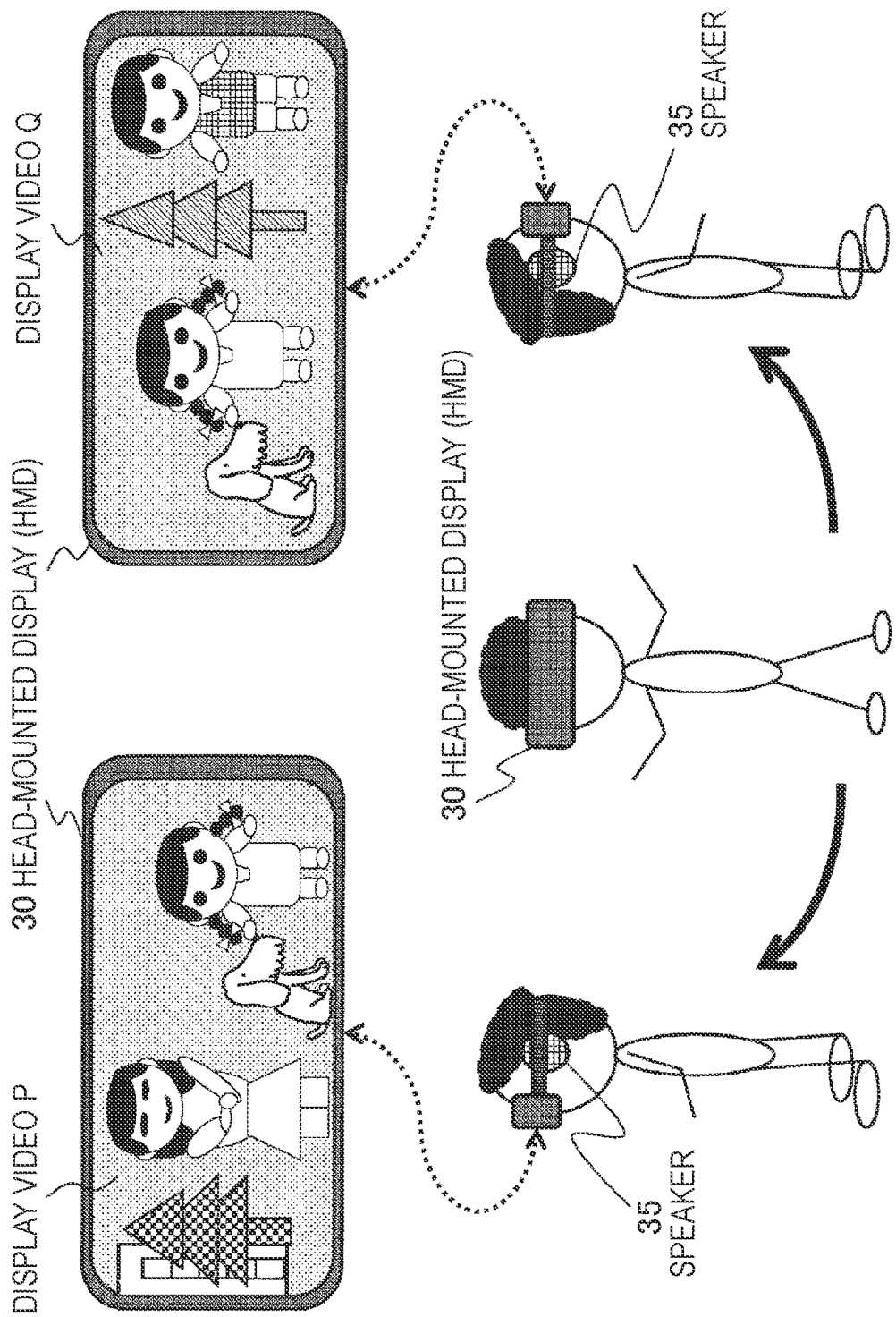
FIG. 2 is an explanatory diagram illustrating examples of a video display process and an audio output process in an information processing device.

FIG. 2 illustrates an example in which a panorama video is displayed using a head-mounted display (HMD) 30.

In a case in which a video is displayed on the head-mounted display (HMD) 30, a video in accordance with a direction of the head of a user is displayed in accordance with information of a sensor which is mounted on the HMD and detects a motion or a direction of the head. Through the video display control, the user can experience a sensation as if the user were in the video displayed on the display unit of the HMD.

A video when the user wearing the HMD 30 faces left is a display video P.

A video when the user wearing the HMD 30 faces right is a display video Q.

The user wearing the HMD 30 can observe a peripheral 360° video by changing the direction of his or her body (head).

Also, the head-mounted display (HMD) 30 also includes a speaker 35 so that audio data recorded together in the display video can be output.

[2. Overview of Configuration in which Designated Video Display Scheme is Selected and Video Display Process is Executed]

When the panorama video described with reference to FIGS. 1 and 2, the celestial video, the omnidirectional video, or the like is displayed on the display unit, a process of cutting a partial video from a multi-directional shot video and displaying the partial video is executed.

There are a plurality of different schemes of a display process involving the video cutting.

For example, the schemes are broadly classified into the following schemes:
a perspective scheme; and
a fish eye (wide angle) display scheme.

Figure 3:
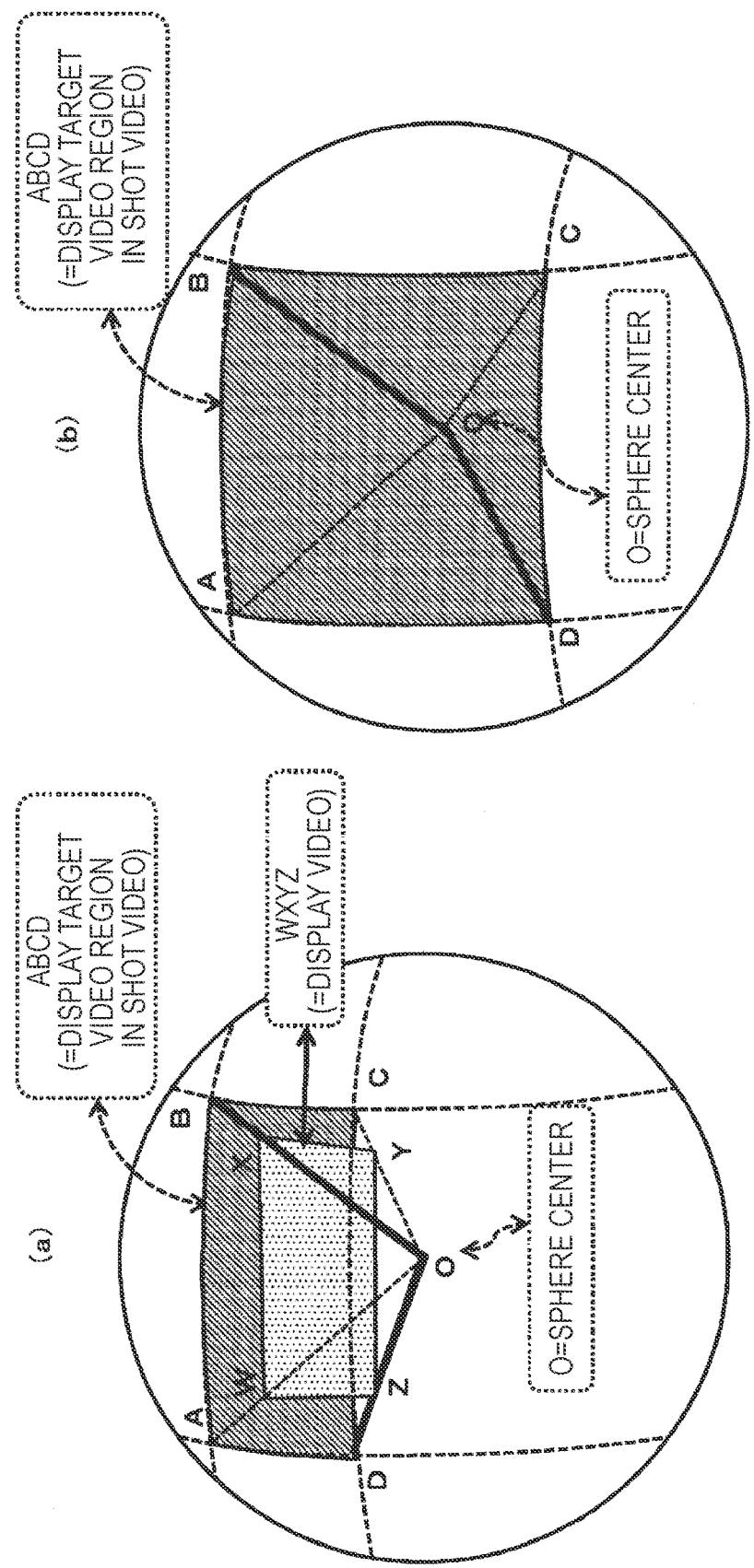
FIG. 3 is an explanatory diagram illustrating a perspective scheme and a fish eye (wide angle) display scheme.

As illustrated in FIG. 3(a), the perspective scheme is a scheme of converting a shot video ABCD to be projected into a display video XYZW using a certain central point O as a reference point. The fish eye (wide angle) display scheme is a video projection conversion scheme to which a fish eye lens is applied. As illustrated in FIG. 3(b), the fish eye display scheme is a scheme of projecting a video to a virtual spherical surface using a central point O of the virtual spherical surface as a reference point and converting the projected video into a display planar video.

Also, as the projection conversion scheme to which a fish eye lens is applied, there are various schemes such as stereographic projection, equidistance projection, equisolid angle projection, and orthographic projection.

In general, applications (programs) executing predetermined display schemes are stored in display devices, for example, display devices of PCs, portable terminals, HMDs, or the like, and display processes are executed in accordance with display schemes selected in accordance with the applications (apps).

However, the display scheme selected by each of the apps does not necessarily match an intention of a content maker, that is, a display scheme realizing a video that appears as the content maker intended.

When video display is executed using a display scheme different from a display scheme assumed by the content maker, a problem that a user (observer) cannot view a "video that appears as intended" by the content maker occurs.

A configuration according to the present disclosure for resolving this problem will be described below.

An information processing device according to the present disclosure to be described below is capable of selecting and executing an optimum display scheme, for example, a display scheme of displaying a video that appears as a content maker intended, at the time of a video display process of outputting a multi-directional video such as an omnidirectional video in response to a manipulation or an operation by a user.

First, an overview of a process executed by the information processing device according to the present disclosure will be described.

As the information processing device that displays the panorama video described with reference to FIGS. 1 and 2, the celestial video, the omnidirectional video, or the like on a display unit, there are the following types of information processing devices (device types), for example:

(a) a device that moves and changes a display video by a user manipulation (a mouse, a touch panel manipulation, swiping, or remote control);
(a1) a PC;
(a2) a tablet terminal:
(a3) a portable terminal; and
(a4) a TV.
(b) a device that moves and changes a display video in accordance with detection information such as a motion or a direction of a user (an observer) or a device (a display device) from a detection sensor;
(b1) an immersive-type head-mounted display (HMD) in which the outside is not visible:
(b2) a glasses-type head-mounted display (HMD) in which the outside is also visible therethrough; and
(b3) a portable terminal such as a mobile device (a device in which a screen can be moved with a motion sensor).

When a panorama video, a celestial video, an omnidirectional video, or the like is displayed on a display unit of any of the various information processing devices, a data processing unit of the information processing device reads metadata set to correspond to a video, applies a display scheme designated in the metadata, and executes the display process.

As designation schemes recorded in metadata, there are the following schemes, for example:

(1) a non-conversion whole display scheme of displaying the whole without conversion:
(2) a perspective scheme:
(3) a scheme of displaying the whole of 360° using two fish eyes;
(4) a fish eye (wide angle) display (stereographic) scheme:
(5) a fish eye (wide angle) display (equidistant) scheme;
(6) a fish eye (wide angle) display (equisolid angle) scheme;
(7) a fish eye (wide angle) display (orthographic) scheme; and
(8) a setting for allowing an information processing device or user designation without limiting the display scheme.

For example, one piece of designation information of (1) to (8) is recorded as metadata corresponding to a video and is supplied to the information processing device along with the video.

The information processing device executes the display process in accordance with the designation scheme recorded in the metadata with reference to the metadata associated with a display video at the time of video display.

Also, the metadata is recorded in, for example, one of the following files:

(1) an MP4 file defined as a storage file of AV content; and
(2) a media presentation description (MPD) file which is one manifest file constituting signaling data (metadata) defined in the MPEG-DASH standard.

The metadata is stored in the MP4 file or the MPD file to be supplied to a user device (an information processing device) that executes video display.

Two embodiments will be described in sequence below.

First Embodiment

Embodiment in which video display scheme to be used in device is defined in MP4 file Second Embodiment Embodiment in which video display scheme to be used in device is defined in MPD file

[3. (First Embodiment) Embodiment in which Video Display Scheme to be Used in Device is Defined in MP4 File]

First, an embodiment in which a video display scheme to be used in a device is defined in an MP4 file will be described as a first embodiment.

Figure 4:
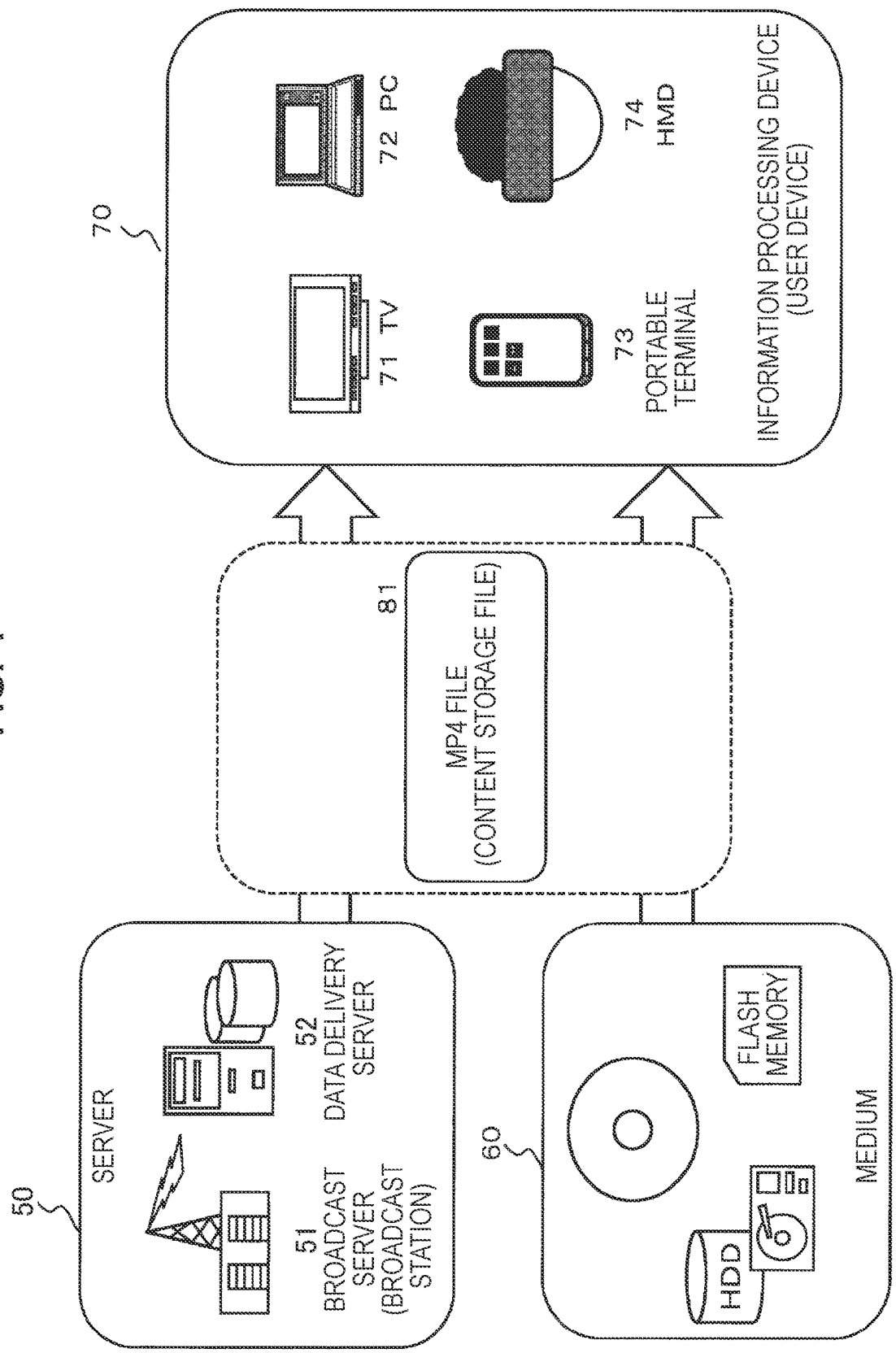
FIG. 4 is an explanatory diagram illustrating a configuration of a data supply process for an information processing device.

FIG. 4 is a diagram illustrating an information processing device 70 executing video display control according to the present disclosure in accordance with the first embodiment, and a server 50 and a medium 60 supplying content including video and audio data to the information processing device 70.

The video data and the audio data of a celestial video, an omnidirectional video, a panorama video, or the like are supplied, for example, from the server 50 illustrated in FIG. 4 to the information processing device 70. Alternatively, the video data and the audio data are supplied from the medium 60 illustrated in FIG. 4 to the information processing device 70.

The server 50 includes, for example, a broadcast server 51 of a broadcast station or the like and another data delivery server 52.

Content is transmitted to the information processing device 70 via a network such as the Internet or broadcast waves.

The information processing device 70 receives the content transmitted from the server 50 via the network such as the Internet or the broadcast waves and reproduces the content.

In addition, the medium 60 includes various media such as a disc, a flash memory, and hard disk mounted on the information processing device.

The information processing device 70 reads content recorded on the medium and reproduces the content.

The information processing device reproducing the content is, for example, a TV 71, a PC 72, a portable terminal 73, a head-mounted display (HMD) 74, or the like and is a device that includes a video display unit and an audio output unit (speaker).

The content supplied from the server 50 or the medium 60 to the information processing device 70 is content that includes video data and audio data configured so that a multi-directional video such as a celestial video, an omni-directional video, or a panorama video can be selectively displayed.

The content is stored in, for example, an MP4 file 81 to be supplied.

The MP4 file 81 is a file in which data is recorded in accordance with an ISO base media file format.

The ISO base media file format is a data format that is defined in conformity with ISO/IEC 14496-12 and is, for example, a data format suitable for recording data on a flash memory or the like or storage data of a transmission data file via a network or broadcast waves.

The ISO base media file format is used, for example, when encoded data which is content configuration data such as a video, audio, and subtitles or metadata (attribute information) related to the data is recorded on a recording medium. Further, the ISO base media file format is also used as a data storage format of data transmitted via a network or broadcast waves.

In recent years, many portable terminals have reproduction applications capable of reproducing MP4 data recorded in accordance with the ISO base media file format. In a case in which content is recorded on a medium of a portable terminal, there are requests for recording with an MP4 format in many cases.

An overview of the ISO base media file format will be described with reference to FIGS. 5 and 6.

Figure 5:
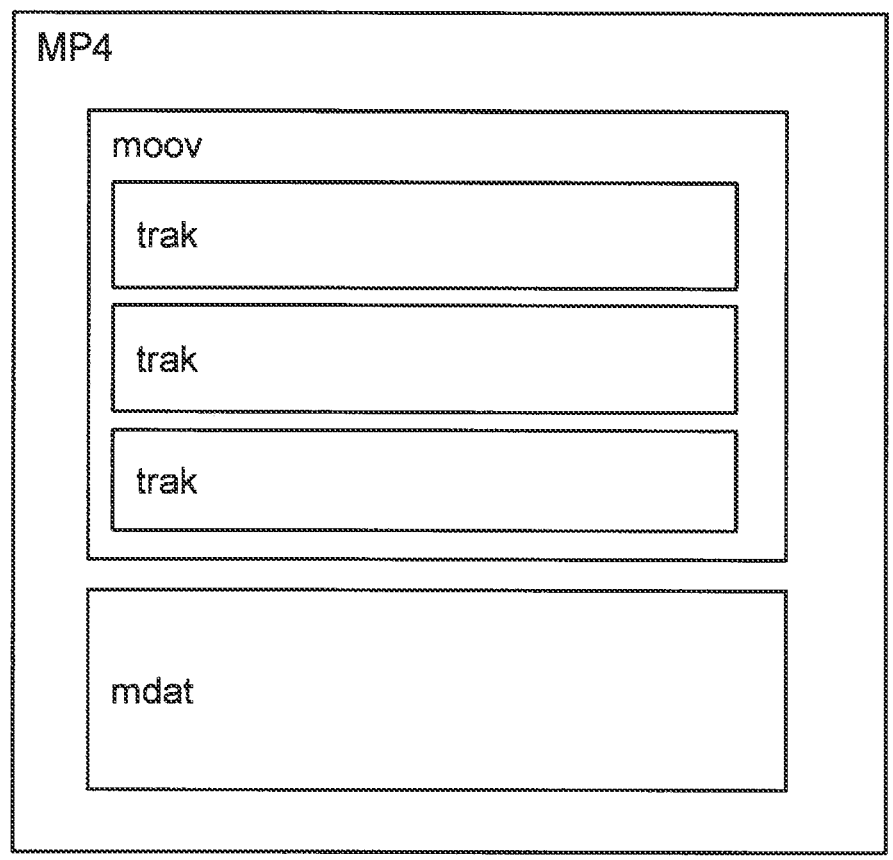
FIG. 5 is an explanatory diagram illustrating an ISO base media file format.

FIG. 5 illustrates an example of the ISO base media file format defined in conformity with ISO/IEC 14496-12.

The MP4 file illustrated in FIG. 5 is a file that is set as one processing unit in a process of recording or reproducing data in accordance with the ISO base media file format.

In the MP4 file, region setting in units of boxes is executed and data defined in units of boxes is stored in each box.

Each box has regions of a box size (box-size), a box type (box-type), and box data (box-data).

A data length (byte size) of the box is recorded in the box size (box-size).

A type of data stored in the box is recorded in the box type (box-type).

Data of the type indicated by the box type is recorded in the box data (box-data).

In the MP4 file illustrated in FIG. 5, the following types of boxes are set:

a moov box;

a trak box; and an mdat box.

The above boxes are set.

Actual data which is reproduction target data such as a video, audio, and subtitles is stored in the mdat box.

In addition, the metadata such as attribute information or reproduction control information regarding data stored in the mdat box is stored in the trak box in the moov box.

The moov box is a box set as a storage region of the metadata (the reproduction control information or the attribute information) of the data stored in the mdat box of the MP4 file.

In the moov box, one or more trak boxes are set. The trak box can be set, for example, by the types of data such as a video, audio, and subtitles and stores the metadata of each piece of data.

An example of a data storage configuration in the MP4 file will be described with reference to FIG. 6. In the MP4 file, as described above, the following boxes are set:

a moov box:

a trak box; and an mdat box.

The above boxes are set.

In the mdat box, for example, the following data is stored:

(a) a video;

(b) audio; and (c) subtitles.

Storage data of the mdat box which is a data portion with the ISO base media file format is divided into samples serving as basic data units.

In one mdat box, a collection of the same kind of data samples such as a collection of only video samples, a collection of only audio samples, or a collection of only subtitle samples is stored.

The moov box is a storage region of the metadata (the reproduction control information or the attribute information) of the data stored in the mdat box of the MP4 file.

In the moov box, one or more trak boxes are set. The trak box can be set, for example, by the types of data such as a video, audio, and subtitles and stores the metadata of each piece of data.

Figure 6:
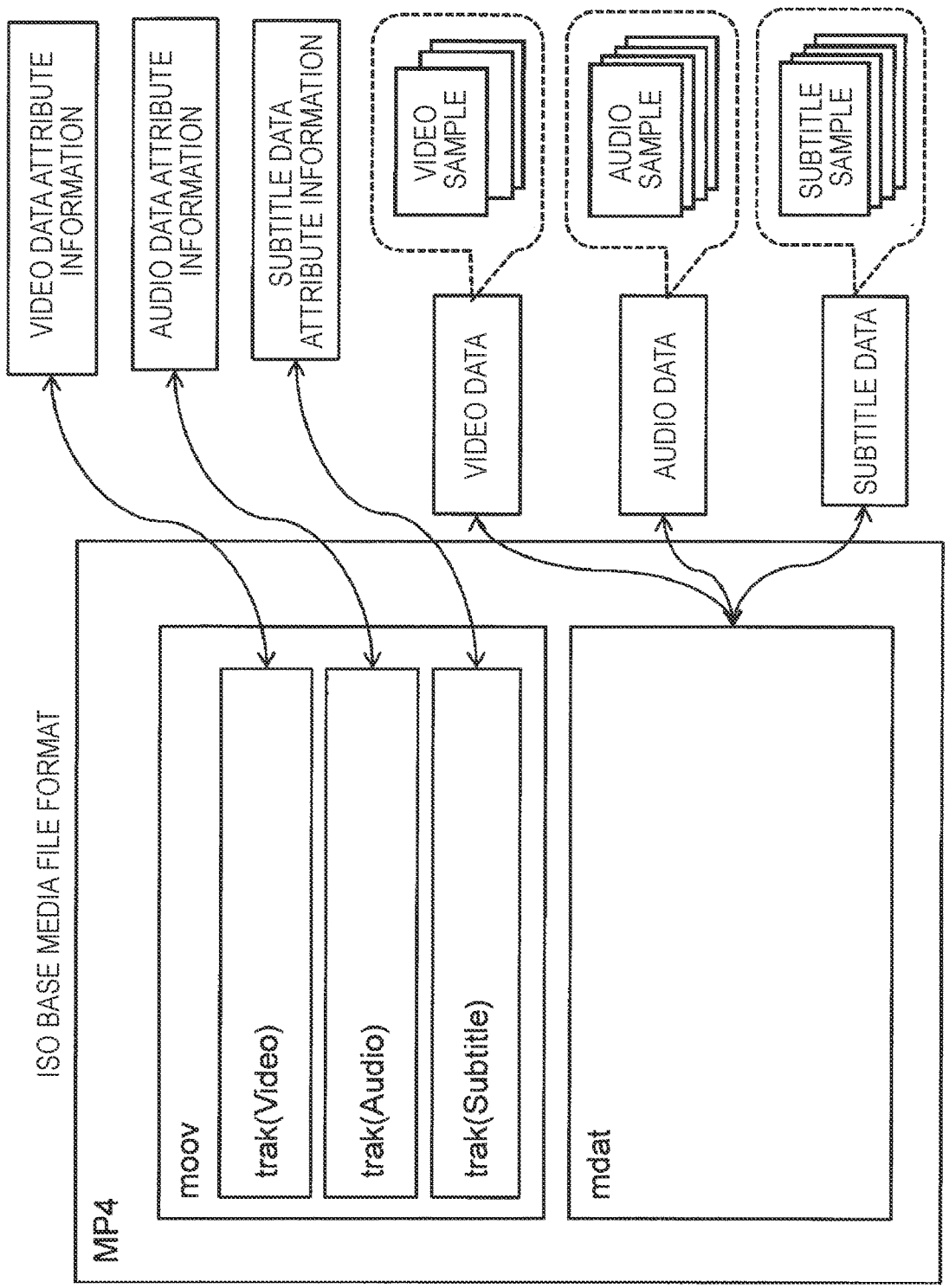
FIG. 6 is an explanatory diagram illustrating an ISO base media file format.

The trak (video) box illustrated in FIG. 6 is a video-correspondent metadata storage box that stores attribute information or control information regarding video data.

The trak (audio) box is a video-correspondent metadata storage box that stores attribute information or control information regarding audio data.

The trak (subtitle) box is a video-correspondent metadata storage box that stores attribute information or control information regarding subtitle data.

Also, in a case in which reproduction data stored in the MP4 file includes a plurality of different pieces of video data, for example, a 2K video and a 4K video, control information in units of the types of videos can be recorded in the trak (video) box.

In addition, in a case in which the audio data stored in the MP4 file includes a plurality of different pieces of audio data, for example, Japanese audio and English audio, individual control information in units of audio channels in accordance with the types of audio can be recorded in the trak (audio) box.

In addition, also for BGM, narration, subject (object) audio, and the like, individual control information in units of audio channels (also including audio output objects) can be recorded in the trak (audio) box.

Next, a specific control information recording example corresponding to a video recorded in the trak (video) box will be described with reference to FIG. 7.

The video display control information illustrated in FIG. 7 is video display control information which is supplied to the information processing device 70 that displays video data configured so that a multi-directional video such as a panorama video can be selectively displayed, on the display unit.

Specifically, the video display control information is control information used to decide a display scheme which is executed among the following display schemes at the time of video display of video data (a panorama video, a celestial video, an omnidirectional video, or the like) stored in the MP4 file:

(1) a non-conversion whole display scheme of displaying the whole without conversion;

(2) a perspective scheme:

(3) a scheme of displaying the whole of 360° using two fish eyes;

(4) a fish eye (wide angle) display (stereographic) scheme:

(5) a fish eye (wide angle) display (equidistant) scheme;

(6) a fish eye (wide angle) display (equisolid angle) scheme;

(7) a fish eye (wide angle) display (orthographic) scheme; and (8) a setting for allowing an information processing device or user designation without limiting the display scheme.

For example, the video display control information is control information used to decide one of the schemes (1) to (8) in accordance with which to execute video display.

The control information recorded in the trak (video) box is recorded as data illustrated in FIG. 7.

That is, for example, the control information is recorded as the following data.

```
aligned(8) class ProjectionType extends
FullBox('PJTT'){
    unsigned int(8) device_count;
    for (i=1; i<=device_count; i++){
        unsigned int(7) device_type;
        unsigned int(1) user_selection_flag;
        unsigned int(8) default_projection_type;
        unsigned int(8) default_diagonal_angle;
        if(user_selection_flag){
            unsigned int(8) user_selection_type_num;
            for (j=1;j<=user_selection_type_num;j++){
                unsigned int(8) user_projection_type;
                unsigned int(8) user_diagonal_angle;
            }
        }
    }
}
```

The control information for designating the video display scheme described in FIG. 7 and the above includes:

(a) device-type-based designation information 90; and (b) user selection permission information 96.

The pieces of information (a) and (b) are included.

The device-type-based designation information 90 is a region in which designation information of a display scheme in accordance with a type of device such as a PC or a head-mounted display (HMD) is recorded.

The device-type-based designation information 90 is a loop region in which a display scheme in units of one or more types of devices is repeatedly recorded.

For example, the designation information of the display scheme in accordance with each device type is recorded by, for example, recording a designation display scheme for a PC and a tablet terminal in a first loop and recording a designation display scheme for an HMD as a second loop.

A device corresponding to a device type identifier recorded in a "device type (device_type) 92 which is a display scheme designation target" in the device-type-based designation information 90 is requested to apply a display scheme designated in a recording region of the device-type-based designation information 90 and execute video display.

User selection permission information 96 is a region which is used in a case in which setting of a "user selection permission flag 93 (user_selection_flag)" in the device-type-based designation information 90 is a setting value for permitting user selection and in which the display schemes which can be freely selected by a user is recorded.

In a case in which the setting of the "user selection permission flag 93 (user_selection_flag)" is the setting value for permitting user selection, the user can freely decide a display scheme among choices recorded in the user selection permission information 96.

The details of recording data of video display scheme control information illustrated in FIG. 7 will be described below.

Data "device_count" in control data illustrated in FIG. 7 is "number of device divisions (the number of loops) 91." as illustrated in FIG. 7. That is, the data "device_count" is the "number of device divisions (the number of loops) 91" recorded in the device-type-based designation information 90.

The device type is a type of information processing device that executes video display and is equivalent to a kind of PC, HMD, or the like.

For example, the device-type-based designation information 90 is assumed to include the following two loops:

(first loop) a designation display scheme for a PC and a tablet terminal; and (second loop) a designation display scheme for an HMD.

In this way, in a case in which two loops are recorded, the "number of device divisions (the number of loops) (device_count) 91" is 2.

In addition, data "device_type" in the control data illustrated in FIG. 7 is a "device type 92 which is a display scheme designation target," as illustrated in FIG. 7.

A specific example of a correspondence relation between device type setting values and device types will be described with reference to FIG. 8.

As illustrated in FIG. 8, correspondence between the device types and the device type setting values is as follows:

a device type setting value=0: no device designation: available in all devices (in a case in which another value other than 0 is written together, available in devices other than a device corresponding to the setting value written together):

a device type setting value=1: an immersive-type head-mounted display (HMD) [an HMD with which only a display video of an HMD display unit can be observed];

a device type setting value=2: a glasses-type head-mounted display (HMD) [an HMD with which not only a display video of an HMD display unit but also an outside scenery transmitted through the HMD can be observed]:

a device type setting value=3: a user-screen-manipulation-type device with which a video can be moved by a screen manipulation (a mouse or touch manipulation or the like) by a user [a PC, a tablet terminal, a portable terminal, or the like]; and a device type setting value=4: a user-motion-manipulation-type device in which a video can be moved by a device movement manipulation (a motion manipulation of shaking a device or the like) by a user [a tablet terminal, a portable terminal, or the like].

For example, in a case in which the first loop of the device-type-based designation information 90 is a designation display scheme for an HMD, the device type setting value=1 or 2 is set for the "device type (device_type) 92 which is a display scheme designation target" of the first loop.

An HMD corresponding to the device type setting value=1 or 2 is requested to apply a display scheme recorded below and execute a display process.

Also, the setting of the correspondence relation illustrated in FIG. 8 is an example. Setting different from the correspondence relation illustrated in FIG. 8 is also possible and a configuration in which setting values are set for devices other than the device types illustrated in FIG. 8 may also be realized.

Data "user_selection_flag" in the control data illustrated in FIG. 7 is a "user selection permission flag 93," as illustrated in FIG. 7.

This is a flag indicating whether a user can select a display scheme. For example, there is the following flag setting:

a user selection permission flag=1; and
a user selection permission flag=0.

In a case in which the user selection permission flag=1, it is possible to execute a display process in the setting selected by the user from a display scheme and a display region diagonal angle set in the following data recording regions illustrated in FIG. 7:

a "user selectable display scheme (user_projection_type) 96"; and a "user selectable display region diagonal angle (user_diagonal_angle) 97."

Data "projection_type" in the control data illustrated in FIG. 7 is a "designation display scheme 94," as illustrated in FIG. 7.

A specific example of a correspondence relation between the setting value of the designation display scheme (projection_type) and display schemes will be described with reference to FIG. 9.

As illustrated in FIG. 9, the correspondence relation between the setting value of the designation display scheme (projection_type) and the display scheme are as follows:

a designation display scheme setting value=0: no designation [a display scheme decided in an information processing device (display device) side can be used]:

a designation display scheme setting value=1: a video is displayed without change (no video conversion is executed);

a designation display scheme setting value=2: a perspective scheme; a designation display scheme setting value=3: a 360° video whole display scheme using two fish eyes;

a designation display scheme setting value=4: a fish eye (wide angle) display scheme [=a stereographic display scheme];

a designation display scheme setting value=5: a fish eye (wide angle) display scheme [=an equidistant display scheme];

a designation display scheme setting value=6: a fish eye (wide angle) display scheme [=an equisolid angle display scheme]: and a designation display scheme setting value=7: a fish eye (wide angle) display scheme [=an orthographic display scheme].

Also, the setting illustrated in FIG. 9 is an example. Setting different from the setting illustrated in FIG. 9 is also possible. In addition, a configuration in which setting values are set for display schemes other than the display schemes illustrated in FIG. 9 may be realized.

Data "diagonal_angle" in the control data illustrated in FIG. 7 is a "display region diagonal angle 95," as illustrated in FIG. 7.

The display region diagonal angle (diagonal_angle) is a region in which display region diagonal angles to be defined are defined in the display scheme (c) 2: the perspective scheme to (h) 7: the fish eye (wide angle) display scheme illustrated in FIG. 8.

In a case in which the display scheme (c) 2: the perspective scheme to (h) 7: the fish eye (wide angle) display scheme illustrated in FIG. 8 is executed, it is necessary to designate a display region diagonal angle and designated angle information is recorded.

Figure 10:
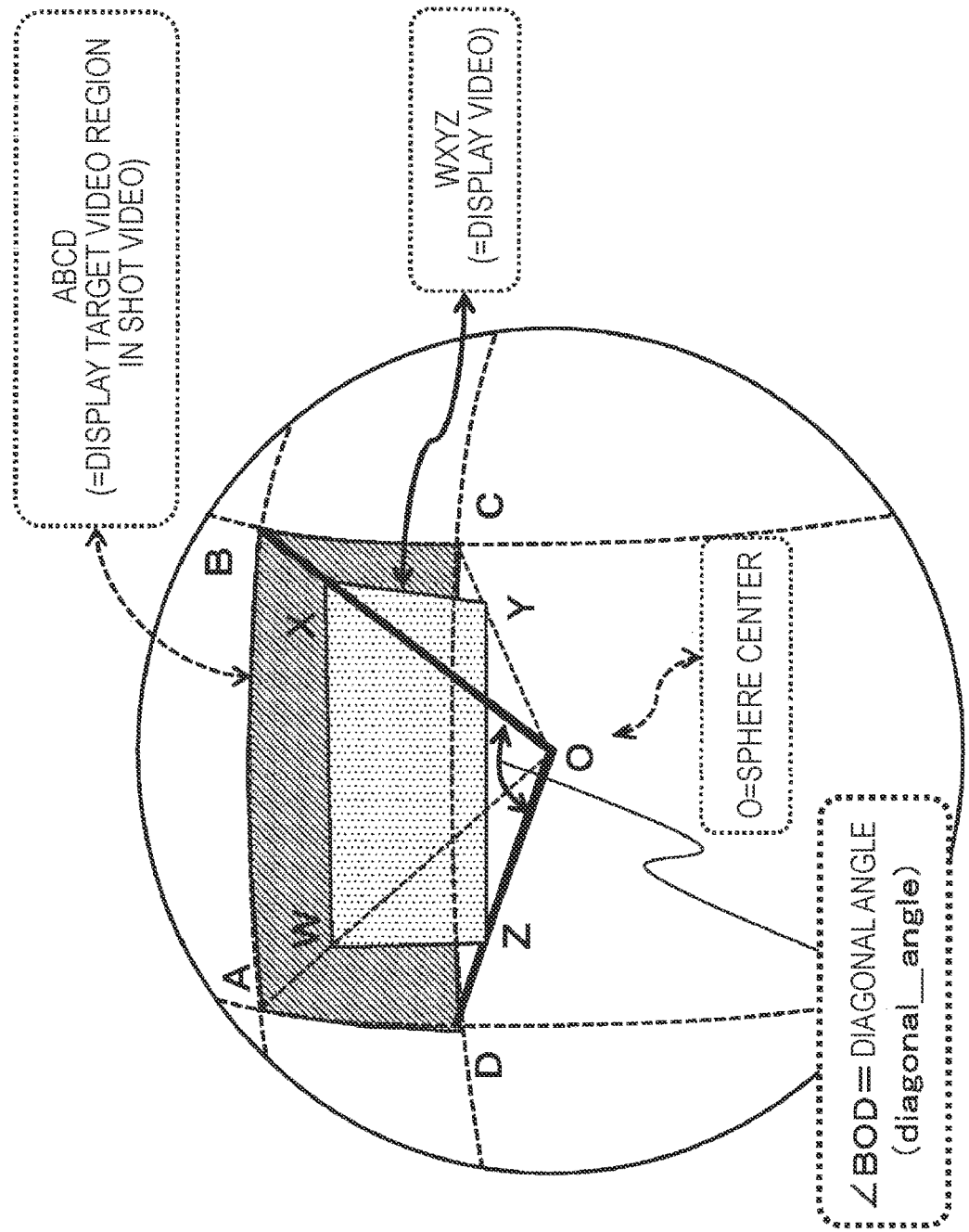
FIG. 10 is an explanatory diagram illustrating an example of a display region diagonal angle.
Figure 11:
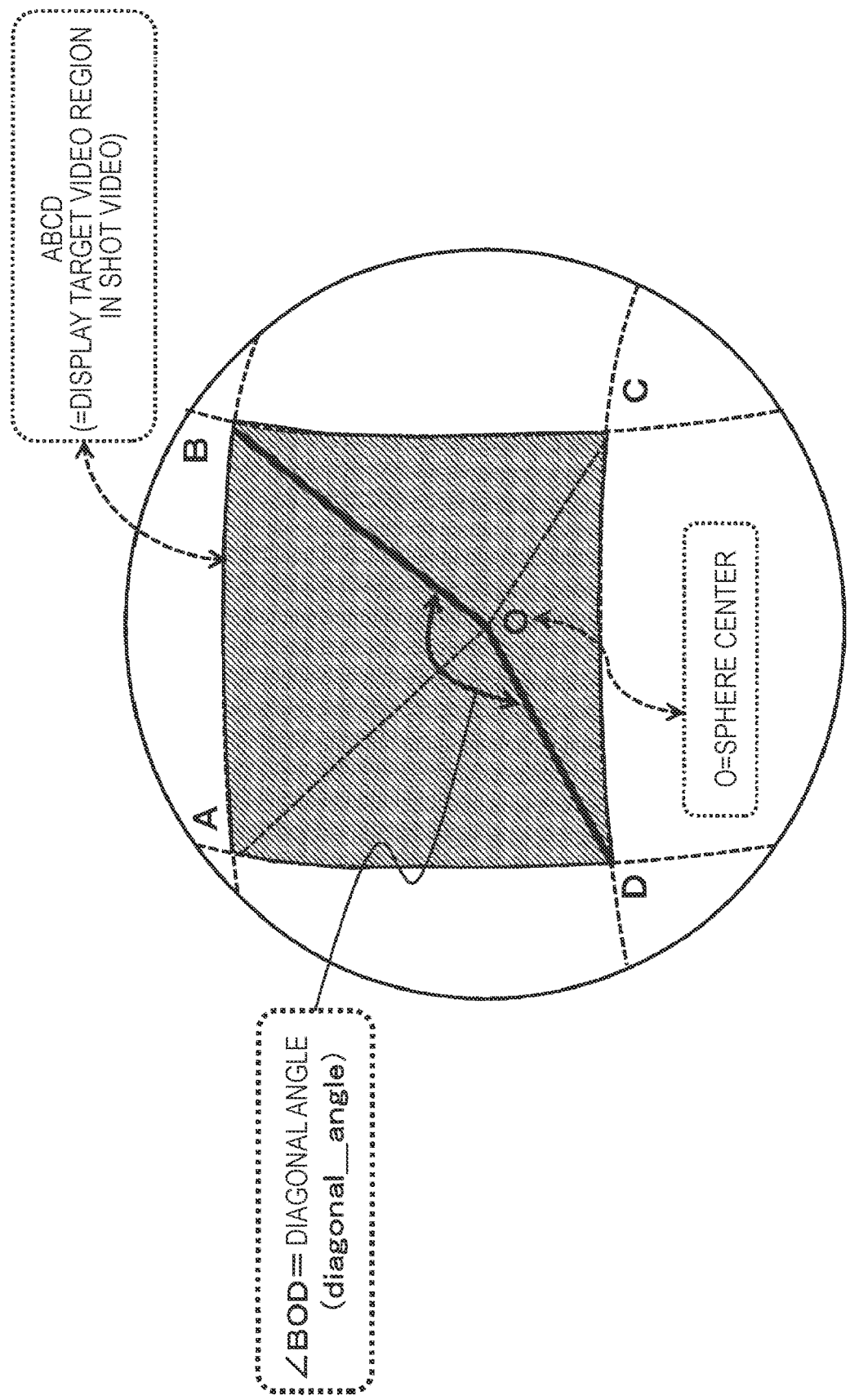
FIG. 11 is an explanatory diagram illustrating an example of a display region diagonal angle.

An example of a diagonal angle (an angle BOD) in the perspective scheme is illustrated in FIG. 10 and an example of a diagonal angle (an angle BOD) in the fish eye (wide angle) scheme is illustrated in FIG. 11.

Data "user_projection_type" in the control data illustrated in FIG. 7 is a "user selectable display scheme 97," as illustrated in FIG. 7.

In addition, data "user_diagonal_angle" in the control data illustrated in FIG. 7 is a "user selectable display region diagonal angle 98," as illustrated in FIG. 7.

As described above, the user selection permission information 96 is the region which is used in a case in which setting of the "user selection permission flag 93 (user_selection_flag)" in the device-type-based designation information 90 is a setting value for permitting user selection and in which the display schemes which can be freely selected by a user is recorded.

In a case in which setting of the "user selection permission flag 93 (user_selection_flag)" is a setting value in which user selection is permitted, the user can freely decide the display scheme among display scheme choices recorded in the "user selectable display scheme 97" of the user selection permission information 96.

Similarly, the user can freely decide a display region diagonal angle among display region diagonal angle choices recorded in the "user selectable display region diagonal angle 98."

The video display control information illustrated in FIG. 7 is recorded in the trak box which is a control information (metadata) recording region corresponding to a video of the MP4 file described above with reference to FIGS. 5 and 6.

In the trak box which is the video display control information recording region, various kinds of control information can be recorded.

One example of a recording position set in the trak box in which the video display control information illustrated in FIG. 7 is recorded will be described with reference to FIG. 12.

(First Control Information Storage Example)

A first control information storage example illustrated in FIG. 12 will be described.

Figure 12:
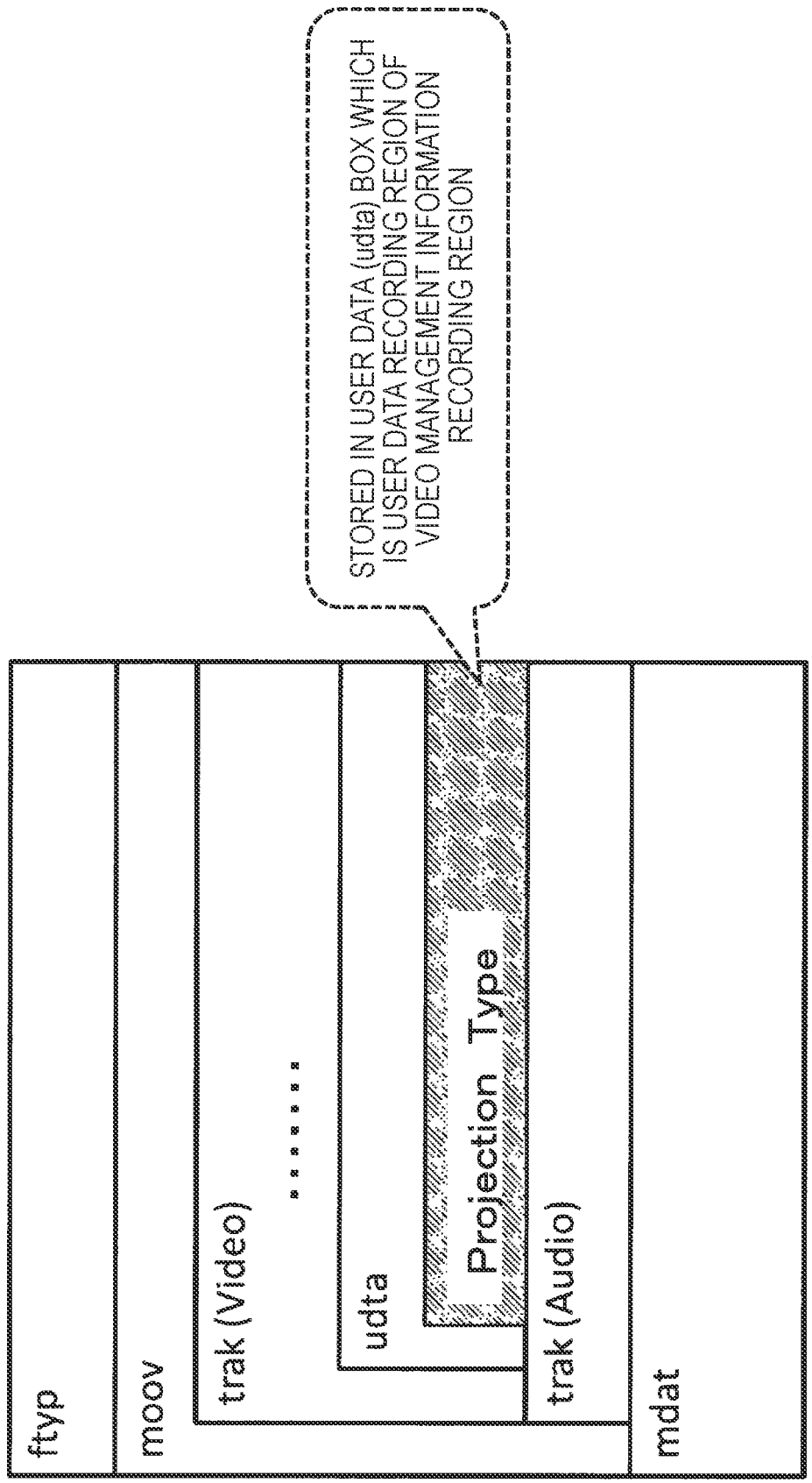
FIG. 12 is an explanatory diagram illustrating an example of a recording region of video display control information in an MP4 file.

The example illustrated in FIG. 12 is an example in which a video display control information (projection type) recording box is set as a subordinate box in a user data (udta) box that stores user data in the trak box which is a video display control information storage box of the MP4 file.

The control information illustrated in FIG. 7 is recorded on the video display control information (projection type) recording box illustrated in FIG. 12.

In the MP4 file 81, for example, the video display control information can be recorded in the metadata recording region described with reference to FIG. 12.

Hereinafter, the following three recording examples will be described in sequence as specific control information recording examples in the MP4 file:

(first video display control information recording example) display scheme designation information in units of content is recorded in the MP4 file;

(second video display control information recording example) display scheme designation information in units of display devices is recorded in the MP4 file; and (third video display control information recording example) display scheme designation information for restricting schemes which can be selected by the user is recorded in the MP4 file.

Hereinafter, each video display control information recording example will be described.

[3-1. (First Video Display Control Information Recording Example) Recording Example in which Display Scheme Designation Information is Recorded in Units of Content in MP4 File]

First, a recording example in which the display scheme designation information in units of content is recorded in the MP4 file will be described as a first video display control information recording example.

In a case in which the display scheme designation information in units of content is recorded in the MP4 file, setting of recording data of the MP4 file is executed as follows:

the number of device divisions (the number of loops) (device_count)=1;

and the device type (device type)=0 (no designation).

This setting is executed.

Further, one loop is set in the recording region of "the device-type-based designation information 90" in the recording data of the video display control information illustrated in FIG. 7, and one common recording scheme is recorded in all the devices.

One of the setting values illustrated in FIG. 9 is recorded in the "designation display scheme (projection_type) 94" in the control data illustrated in FIG. 7.

That is, a designation display scheme setting value=0: no designation [a display scheme decided in an information processing device (display device) side can be used]:

a designation display scheme setting value=1: a video is displayed without change (no video conversion is executed);

a designation display scheme setting value=2: a perspective scheme:

a designation display scheme setting value=3: a 360° video whole display scheme using two fish eyes;

a designation display scheme setting value=4: a fish eye (wide angle) display scheme [=a stereographic display scheme];

a designation display scheme setting value=5: a fish eye (wide angle) display scheme [=an equidistant display scheme];

a designation display scheme setting value=6: a fish eye (wide angle) display scheme [=an equisolid angle display scheme]; and a designation display scheme setting value=7: a fish eye (wide angle) display scheme [=an orthographic display scheme].

One of the setting values is recorded.

Further, designated display region diagonal angle data is recorded in the "display region diagonal angle (diagonal_angle) 95" in the control data illustrated in FIG. 7, as necessary.

A display device (information processing device) such as a PC or an HMD executing video display interprets the video display control information, executes a designated display scheme, and executes a video display process.

[3-2. (Second Video Display Control Information Recording Example) Recording Example in which Display Scheme Designation Information is Recorded in Units of Display Devices in MP4 File]

Next, a recording example in which the display scheme designation information in units of display devices is recorded in the MP4 file will be described as a second video display control information recording example.

In a case in which the display scheme designation information in units of display devices is recorded in the MP4 file, setting of recording data of the MP4 file is executed as follows, for example:

the number of device divisions (the number of loops) (device_count)=2.

The following two loops are set in the device-type-based designation information:

the device type (device_type)=1 (HMD); and the device type (device_type)=0 (no designation).

This setting is executed.

In a first loop of the device-type-based designation information, recording scheme designation information corresponding to the device type (device_type)=1 (HMD) is recorded.

One of the setting values illustrated in FIG. 9 is recorded in the "designation display scheme (projection_type) 94" in the control data illustrated in FIG. 7.

Further, designated display region diagonal angle data is recorded in the "display region diagonal angle (diagonal_angle) 95" in the control data illustrated in FIG. 7, as necessary.

Further, in a second loop of the device-type-based designation information, recording scheme designation information corresponding to the device type (device_type)=0 (no designation) is recorded.

One of the setting values illustrated in FIG. 9 is recorded in the "designation display scheme (projection_type) 94" in the control data illustrated in FIG. 7.

Further, designated display region diagonal angle data is recorded in the "display region diagonal angle (diagonal_angle) 95" in the control data illustrated in FIG. 7, as necessary.

In a case in which the display device (information processing device) executing the video display is an HMD, the display device executes the video display process in accordance with the designation scheme recorded in the first loop of the device type-based designation information, that is, the following designation data:

the "designation display scheme (projection_type) 94"; and the "display region diagonal angle (diagonal_angle) 95."

In a case in which the display device (information processing device) executing the video display is a device other than an HMD, the display device executes the video display process in accordance with the designation scheme recorded in the second loop of the device type-based designation information, that is, the following designation data:

the "designation display scheme (projection_type) 94"; and the "display region diagonal angle (diagonal_angle) 95."

[3-3. (Third Video Display Control Information Recording Example) Recording Example in which Display Scheme Designation Information for Restricting Scheme which can be Selected by User is Recorded in MP4 File]

Next, a recording example in which the display scheme designation information for restricting a scheme which can be selected by a user is recorded in the MP4 file will be described as a third video display control information recording example.

In a case in which the display scheme designation information for restricting the scheme which can be selected by the user is recorded in the MP4 file, setting of recording data of the MP4 file is executed as follows, for example.

The "user selection permission flag 93 (user_selection_flag)" in the device-type-based designation information 90 is set to a setting value for permitting user selection:

the user selection permission flag=1.

Further, the schemes or the like which can be selected by the user are recorded in the user selection permission information 96.

The display schemes, the display region diagonal angles, and the like to be permitted are recorded in the following data recording regions:

the "user selectable display scheme (user_projection_type) 97"; and the "user selectable display region diagonal angle (user_diagonal_angle) 98."

The display device (information processing device) executing the video display applies a scheme and an angle selected by the user from the schemes and angles recorded in the following regions and executes the video display process:

the "user selectable display scheme (user_projection_type) 97"; and the "user selectable display region diagonal angle (user_diagonal_angle) 98."

[4. Video Display Control Process Sequence in which Video Display Control Information Recorded in MP4 File is Used]

Next, a video display control process sequence executed by the information processing device, that is, a video display control process sequence in which the video display control information recorded in the MP4 file is used, will be described.

Figure 13:
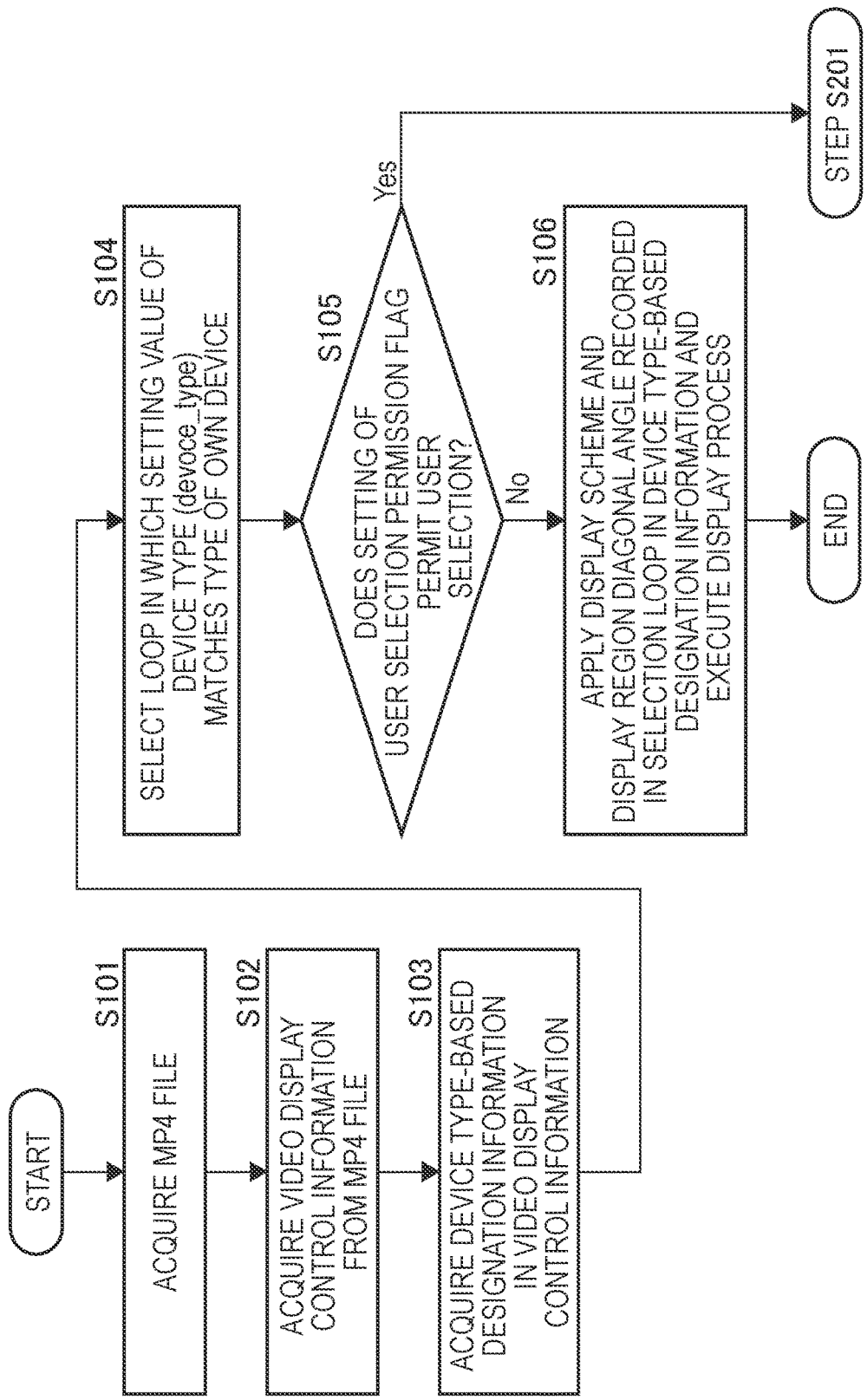
FIG. 13 is a diagram illustrating an explanatory flowchart of an execution sequence of reading of video display control information from an MP4 file and a video display control process.
Figure 14:
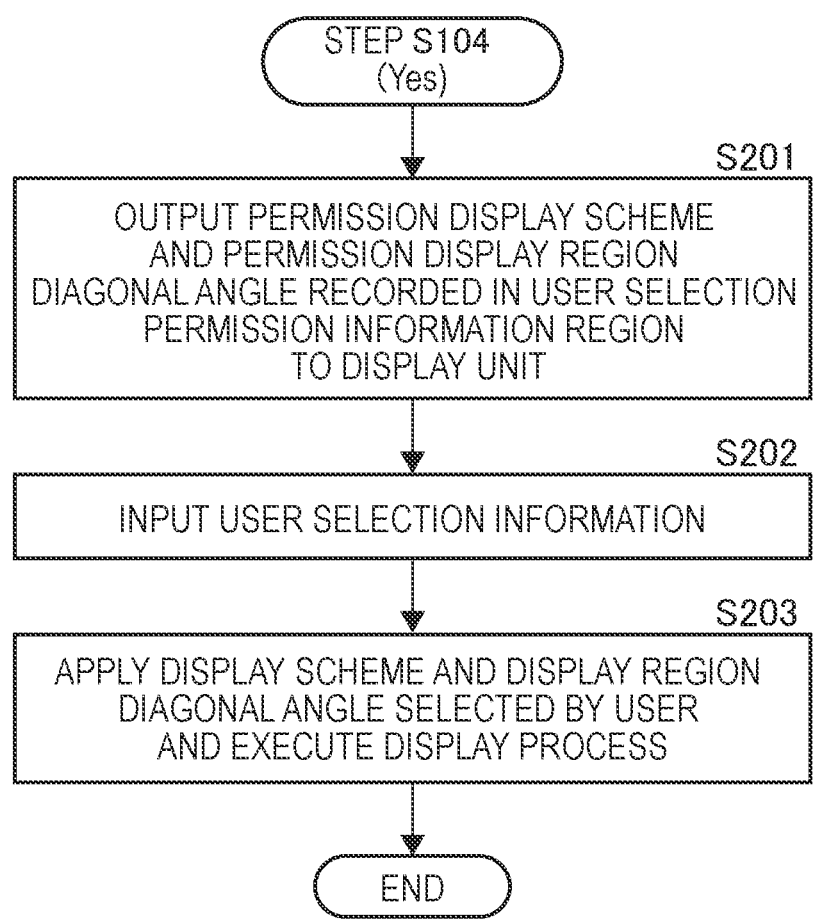
FIG. 14 is a diagram illustrating an explanatory flowchart of an execution sequence of reading of video display control information from an MP4 file and a video display control process.

The flowcharts illustrated in FIGS. 13 and 14 are explanatory flowcharts illustrating the video display control process sequence executed in the information processing device 70 which is a user device.

The information processing device 70 includes a display unit (display) and an audio output unit (speaker).

The information processing device 70 is, for example, a TV, a PC, a portable terminal, a head-mounted display (HMD), or the like.

The information processing device 70 acquires the MP4 file from, for example, the server 50 or the medium 60 illustrated in FIG. 4 and reproduces content recorded in the MP4 file.

The reproduced content is content that includes a video in which a multi-directional video such as a celestial video, an omnidirectional video, or a panorama video can be observed and includes audio information which is reproduced along with the video.

Video data and audio data are stored in the MP4 file and control information corresponding to the video data and the audio data are also further stored in the MP4 file.

The video display control information includes the control information described above with reference to FIG. 7.

The process sequence executed in the information processing device 70 will be described with reference to the flowcharts illustrated in FIGS. 13 and 14.

Also, processes in the flowcharts illustrated in FIGS. 13 and 14 are executed in the information processing device 70. The information processing device 70 includes a data processing unit including a CPU that has a program execution function and each process is executed under the control of the data processing unit. Also, a hardware configuration example of the information processing device 70 will be described later.

A process of each step of the flows illustrated in FIGS. 13 and 14 will be described.

(Step S101)

In step S101, the data processing unit of the information processing device acquires an MP4 file.

(Step S102)

Subsequently in step S102, the data processing unit of the information processing device acquires video display control information from the acquired MP4 file.

For example, the video display control information is the video display control information described with reference to FIG. 7.

(Step S103)

Subsequently, in step S103, the data processing unit of the information processing device acquires device-type-based designation information from the video display control information acquired in step S102.

The device-type-based designation information is the device-type-based designation information 90 described with reference to FIG. 7.

As described above with reference to FIG. 7, the device-type-based designation information 90 is a region in which designation information of a display scheme in accordance with a type of device such as a PC or a head-mounted display (HMD) is recorded.

The device-type-based designation information 90 is a loop region in which a display scheme in units of one or more types of devices is repeatedly recorded.

For example, the designation information of the display scheme in accordance with each device type is recorded by, for example, recording a designation display scheme for a PC and a tablet terminal in a first loop and recording a designation display scheme for an HMD as a second loop.

(Step S104)

Subsequently, in step S104, the data processing unit of the information processing device selects a data recording region (loop) in which the setting value of the device type (device_type) recorded in the device-type-based designation information matches the device type of the own device.

(Step S105)

Subsequently, in step S105, the data processing unit of the information processing device determines whether the setting value of the user selection permission flag (user_selection_flag) recorded in the loop in the device-type-based designation information selected in step S104 indicates user selectable setting.

In the case of the user selectable setting, the process proceeds to step S201.

In the case of user unselectable setting, the process proceeds to step S106.

(Step S106)

In a case in which the setting value of the user selection permission flag (user_selection_flag) recorded in the loop in the device-type-based designation information selected in step S104 is the user unselectable setting, the process of step S106 is executed.

The data processing unit of the information processing device executes, in step S106, the video display process according to designation of the following (a) and (b) recorded in the selection loop in the device-type-based designation information:

(a) the designation display scheme (projection_type); and
(b) the display region diagonal angle (diagonal_angle).

(Step S201)

Conversely, in a case in which the setting value of the user selection permission flag (user_selection_flag) recorded in the loop in the device-type-based designation information selected in step S104 is the user selectable setting, the process of step S201 is executed.

The data processing unit of the information processing device acquires, in step S201, the following data recorded in the user selection permission information region and displays the permission scheme and the permission angle information on the display unit:

(a) the "user selectable display scheme (user_projection_type)"; and
(b) the "user selectable display region diagonal angle (user_diagonal_angle)."

That is, a UI for selecting a desired scheme and angle is presented to the user.

(Step S202)

Subsequently, the data processing unit of the information processing device inputs input information of the user, that is, the display scheme and the display region angle information desired by the user.

(Step S203)

Subsequently; the data processing unit of the information processing device applies the input information of the user, that is, the scheme and the angle selected in accordance with the display scheme and the display region angle information desired by the user and executes the video display process.

[5. (Second Embodiment) Embodiment in which Video Display Control Information is Recorded in MPD]

Next, an embodiment in which video display control information is recorded in an MPD will be described as a second embodiment.

Figure 15:
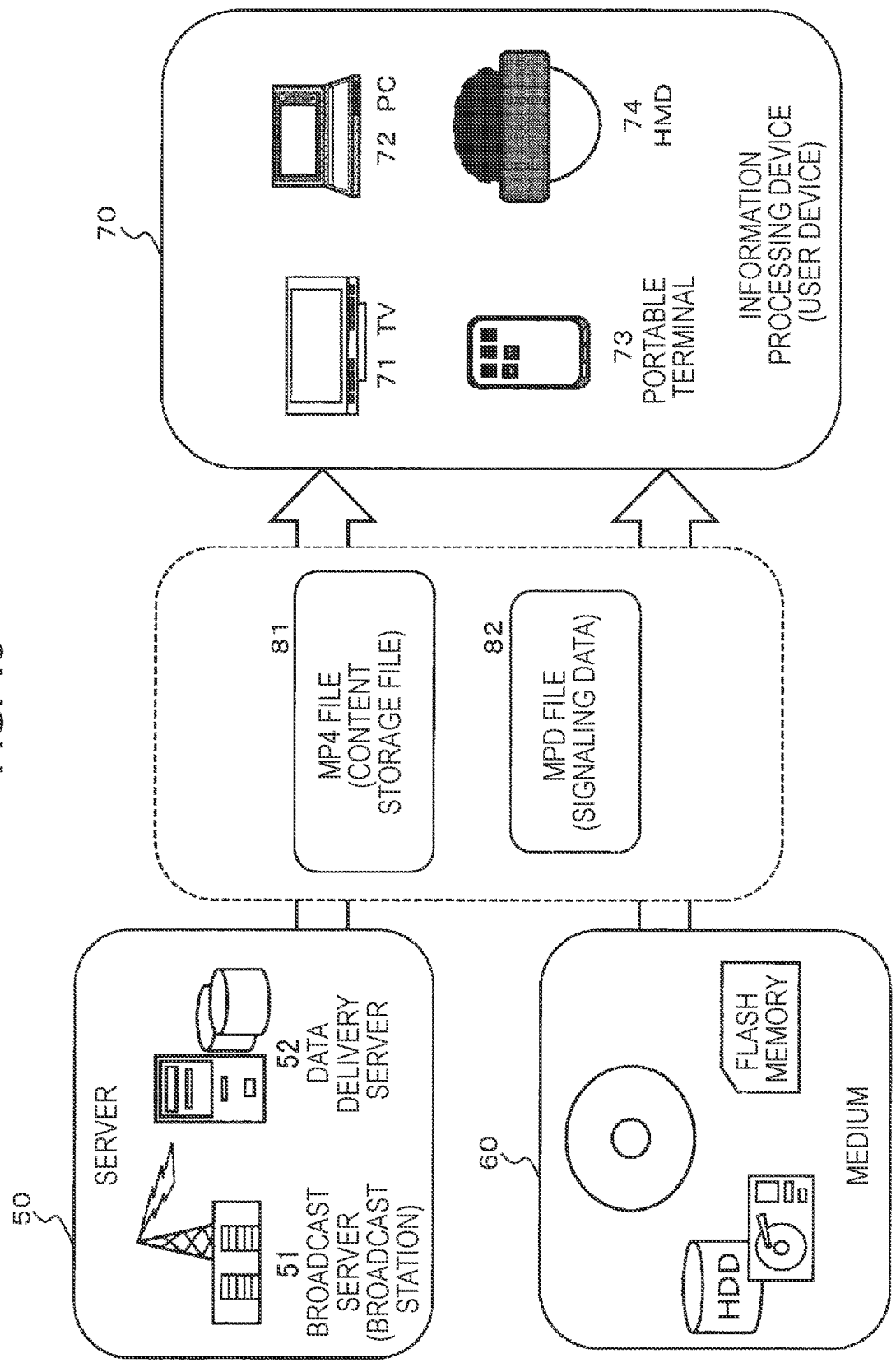
FIG. 15 is an explanatory diagram illustrating a configuration of a data supply process for an information processing device.

FIG. 15 is a diagram illustrating an information processing device 70 executing video display control according to the present disclosure in accordance with the second embodiment, and a server 50 and a medium 60 supplying content including video and audio data to the information processing device 70.

The video data and the audio data of a celestial video, an omnidirectional video, a panorama video, or the like is transmitted from the server 50 illustrated in FIG. 4 or is read from the medium 60 to be supplied to the information processing device 70.

The server 50 includes, for example, the broadcast server 51 of a broadcast station or the like and the other data delivery server 52 and transmits various kinds of data to the information processing device 70 via a network such as the Internet or broadcast waves.

The information processing device 70 receives the data transmitted from the server 50 via the network such as the Internet or the broadcast waves and reproduces the data.

The medium 60 is any of various media such as a disc, a flash memory, and a hard disk mounted on the information processing device.

The information processing device 70 reads data recorded on the medium and reproduces the data.

The information processing device reproducing the content is, for example, a TV 71, a PC 72, a portable terminal 73, a head-mounted display (HMD) 74, or the like and is a device that includes a video display unit and an audio output unit (speaker).

The content supplied from the server 50 or the medium 60 to the information processing device 70 is content that includes video data and audio data configured so that a multi-directional video such as a celestial video, an omni-directional video, or a panorama video can be selectively displayed.

The content is stored in, for example, an MP4 file 81 to be supplied, as in the first embodiment described above.

In the first embodiment described above, for example, the video display control information described with reference to FIG. 7 has been recorded in the trak box which is the storage region of the metadata of the MP4 file.

In the second embodiment, the video display control information regarding the video data stored in the MP4 file 81 illustrated in FIG. 15 is stored in an MPD file 82 different from the MP4 file 81 to be supplied to the information processing device 70.

The media presentation description [MPD] file 82 is one manifest file that constitutes signaling data (metadata) defined in the MPEG-DASH standard which is a standard related to streaming delivery content.

The MPD file 82 is a manifest file for describing metadata which is management information of a moving image or audio file.

The second embodiment is an embodiment in which the video display control information regarding the video data stored in the MP4 file 81 is recorded in the MPD file 82.

In the MPD file 82, various kinds of control data can be recorded, for example, in units of periods which are time sections formed by segmenting a reproduction time of certain content.

A configuration example of the MPD file will be described with reference to FIGS. 16 and 17.

Figure 16:
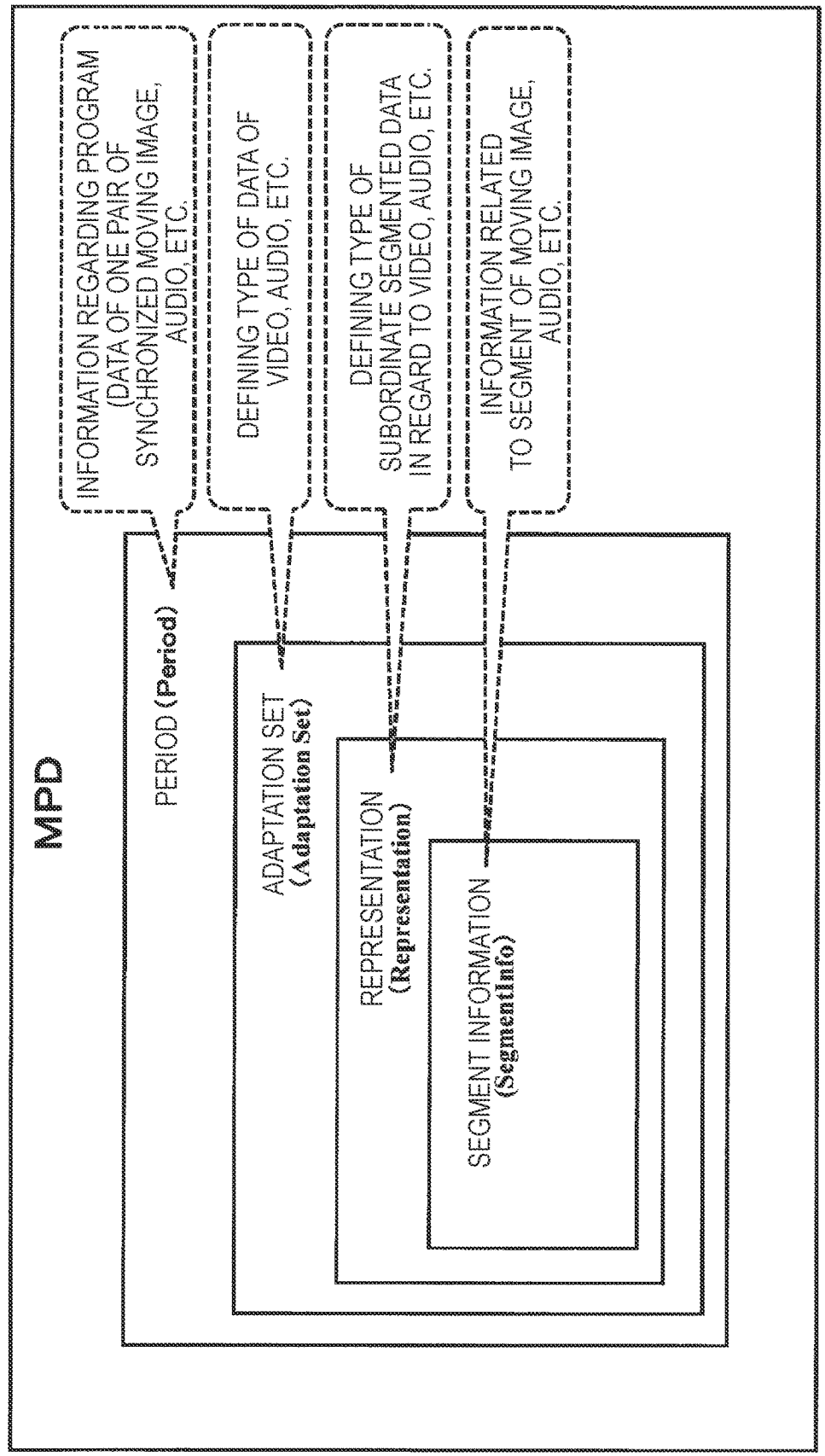
FIG. 16 is an explanatory diagram illustrating an MPD file.

FIG. 16 is a diagram illustrating an example of an MPD format.

As illustrated in FIG. 16, MPD can describe information such as an attribute or control information in the following various definition range units for each stream of a video or audio:

(1) a period (Period) defining a section on the time axis:
(2) an adaptation set (AdaptatiobSet) defining a type of data of a video, audio, or the like;
(3) a representation (Representation) defining a type of subordinate segmented data of a video, audio, or the like; and
(4) segment information (SegmentInfo) serving as an information recording region in units of segments (AV segments) of a video or audio.

Figure 17:
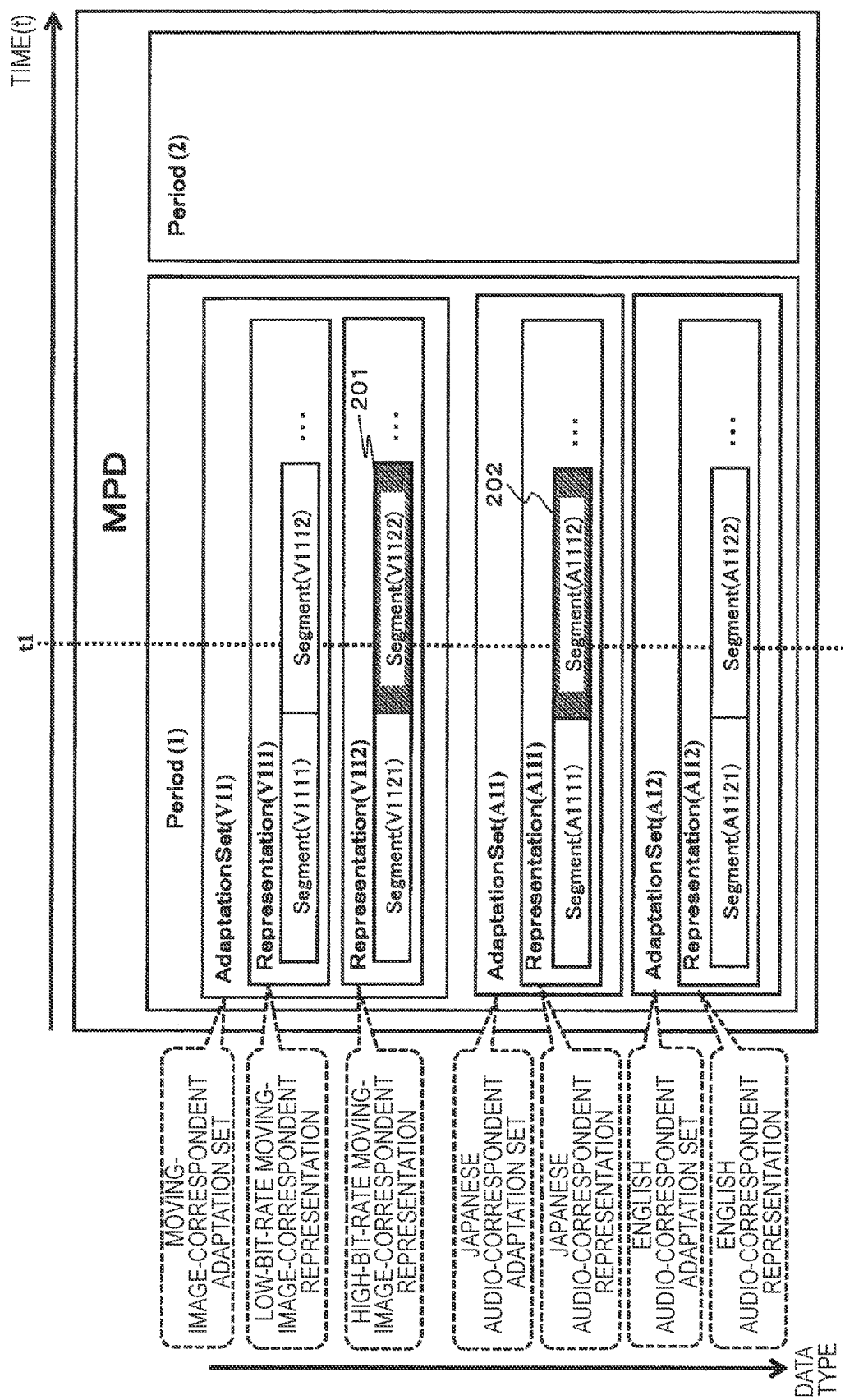
FIG. 17 is an explanatory diagram illustrating an MPD file.

FIG. 17 is a diagram illustrating chronological development of information (control information, management information, attribute information, or the like) corresponding to an AV segment recorded in the MPD.

Time is assumed to elapse from the left to the right. The time axis corresponds to a reproduction time of AV content in, for example, the information processing device.

Various kinds of information corresponding to the AV segments are recorded in the MPD. Also, for example, in a case in which the MPD file 82 is supplied from the server 50 to the information processing device 70, the MPD is transmitted as signaling data earlier than the MP4 file 81 that stores the AV segment which is reproduction target actual data.

The information processing device 70 can analyze the MPD and acquire access information or codec information of the MP4 file 81 storing the AV segment which is reproduction target actual data and can make reproduction preparation of the AV segment stored in the MP4 file 81.

As described with reference to FIG. 16, the MPD is configured to record the metadata (signaling data) such as attribute information or control information regarding the AV segment under the following hierarchical setting:

(1) a period (Period):
(2) an adaptation set (AdaptatiobSet);
(3) a representation (Representation); and
(4) segment information (SegmentInfo).

FIG. 17 is a diagram illustrating development of the metadata recording regions by a time axis and a type of data.

In FIG. 17, two periods, for example, period 1 (Period (1)) and period 2 (Period (2)), are illustrated and the following three adaptation sets (AdaptationSet) are illustrated in the period 1 (Period (1)):

(V11) an adaptation set V11 (AdaptatiobSet (V11)) which is a video-correspondent information recording region;

(A11) an adaptation set A11 (AdaptatiobSet (A11)) which is a Japanese audio-correspondent information recording region; and (A12) an adaptation set A12 (AdaptatiobSet (A12)) which is an English audio-correspondent information recording region.

(V11) An adaptation set V11 (AdaptatiobSet (V11)) which is a video-correspondent information recording region includes the following two representations (Representation) as information recording regions in units of streams with different attributes.

(V111) a representation (V111) (Representation (V111)) which is a low-bit-rate video-correspondent information recording region.

(V112) a representation (V112) (Representation (V112)) which is a high-bit-rate video-correspondent information recording region.

Similarly, (A11) an adaptation set A11 (AdaptatiobSet (A11)) which is a Japanese audio-correspondent information recording region includes the following representation:

(A111) a representation A(111) (Representation (A111)) which is a Japanese audio-correspondent information recording region.

Similarly, (A12) an adaptation set A12 (AdaptatiobSet (A12)) which is an English audio-correspondent information recording region includes the following representation:

(A121) a representation (A121) (Representation (A121)) which is an English audio-correspondent information recording region.

Further, each representation (Representation) is configured such that information can be recorded in units of segments.

For example, the information processing device (client) that selects and reproduces a high-bit-rate video and Japanese audio at time t1 selects and acquires information regarding the high-bit-rate video and the Japanese audio which are reproduction targets from the MPD.

The recording information of the MPD which is the selection target is information of segment regions 201 and 202 illustrated in the drawing.

In this way, a reception device selects only information corresponding to data (segment), which is a reproduction target of the own device from the MPD transmitted as signaling data from a transmission device, to refer to the information.

In this way, in the MPD, a kind of data and segment-correspondent information in units of time can be recorded.

The second embodiment to be described below is an embodiment in which video or audio data (AV segment) which is reproduction target data is stored in the MP4 file 81 illustrated in FIG. 15 and control information regarding the video or audio data (AV segment) stored in the MP4 file 81 is stored in the MPD file 82.

In a case in which the video display control information of a panorama video or the like is recorded in the MPD, a new descriptor is prepared in a role element which is a constituent element of the MPD. An URI corresponding to the video control information is assumed to be, for example, "http://foo.bar/scheme/DefaultProjectionType" and "http://foo.bar/scheme/UserProjectionType."

In the MPD, a designation display aspect is recorded in each of the following two divisions (a) and (b):

(a) a display format which is automatically selected as a default display scheme (DefaultProjectionType) at the time of reproduction of a video is recorded; and (b) a display format which can be selected as the user display scheme (UserProjectionType) by the user is recorded.

In the MPD, recording scheme information designated in each of the two divisions is recorded.

In each of the divisions, in a case in which a designation value (Value) to be recorded is assumed to be the following comma separated values:

a setting value (value)=(x, y, z),
x=device type (device_type):
y=designation display scheme (projection_type); and
z=display region diagonal angle (diagonal_angle) are set.

A value set in (x, y, z) is as follows:

The value described above with reference to FIG. 8 is set in x=device type (device_type). That is, a device type setting value=0: no device designation: available in all devices (in a case in which another value other than 0 is written together, available in devices other than a device corresponding to the setting value written together);

a device type setting value=1: an immersive-type head-mounted display (HMD) [an HMD with which only a display video of an HMD display unit can be observed];

a device type setting value=2: a glasses-type head-mounted display (HMD) [an HMD with which not only a display video of an HMD display unit but also an outside scenery transmitted through the HMD can be observed];

a device type setting value=3: a user-screen-manipulation-type device with which a video can be moved by a screen manipulation (a mouse or touch manipulation or the like) by a user [a PC, a tablet terminal, a portable terminal, or the like]; and a device type setting value=4: a user-motion-manipulation-type device in which a video can be moved by a device movement manipulation (a motion manipulation of shaking a device or the like) by a user [a tablet terminal, a portable terminal, or the like].

One value among the values (0 to 4) is set in x=device type (device_type).

The value described above with reference to FIG. 9 is set in y=designation display scheme (projection_type). That is, a designation display scheme setting value=0: no designation [a display scheme decided in an information processing device (display device) side can be used];

a designation display scheme setting value=1: a video is displayed without change (no video conversion is executed);

a designation display scheme setting value=2: a perspective scheme;

a designation display scheme setting value=3: a 360° video whole display scheme using two fish eyes;

a designation display scheme setting value=4: a fish eye (wide angle) display scheme [=a stereographic display scheme];

a designation display scheme setting value=5: a fish eye (wide angle) display scheme [=an equidistant display scheme];

a designation display scheme setting value=6: a fish eye (wide angle) display scheme [=an equisolid angle display scheme]: and a designation display scheme setting value=7: a fish eye (wide angle) display scheme [=an orthographic display scheme].

One value among the values (0 to 7) is set in y=designation display scheme (projection_type).

In z=display region diagonal angle (diagonal_angle), the display region diagonal angles defined in the display scheme (c) 2: the perspective scheme to (h) 7: the fish eye (wide angle) display scheme illustrated in FIG. 8 are recorded.

For example, angle information such as 180 or 120 is recorded.

Figure 18:
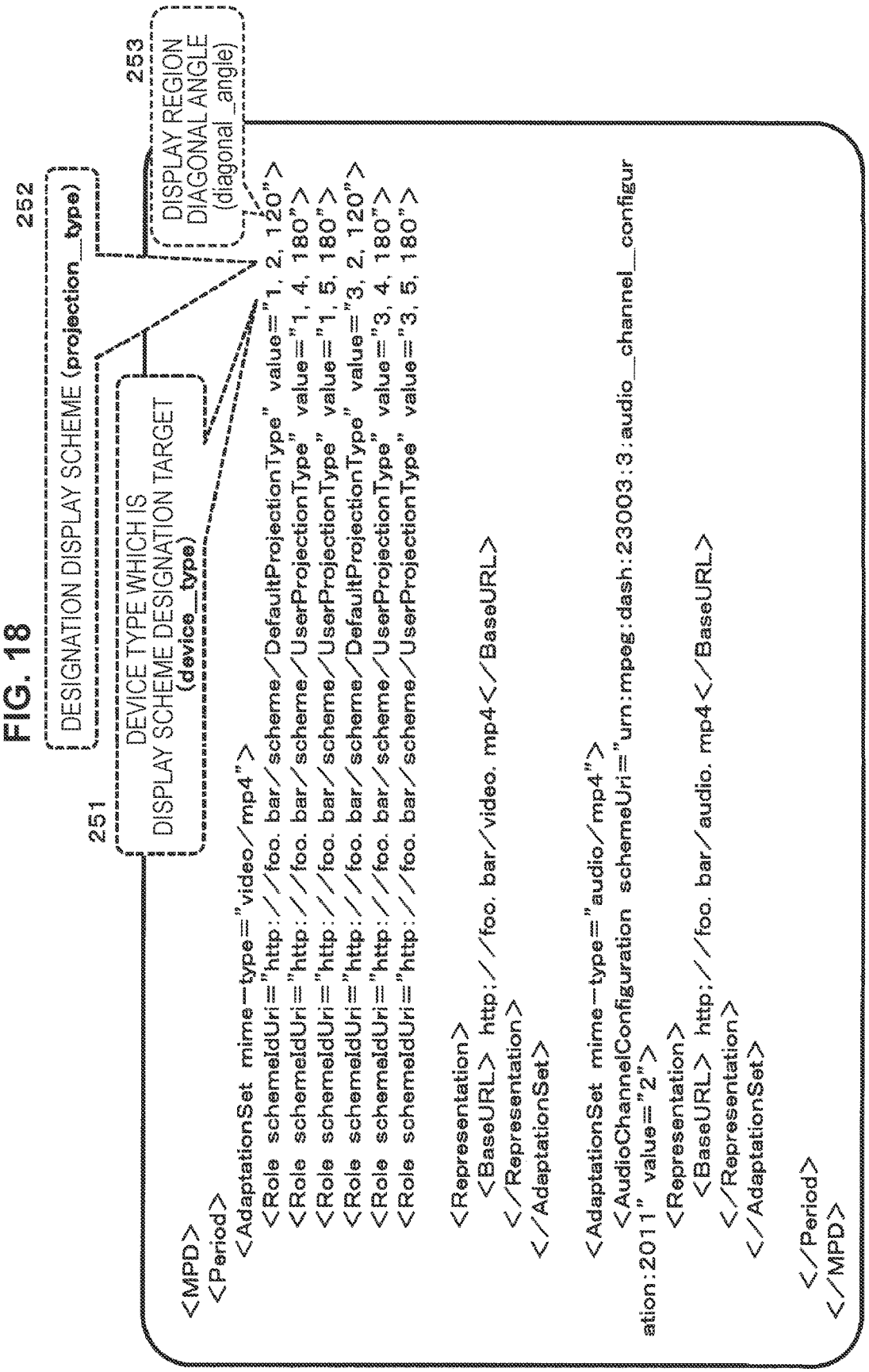
FIG. 18 is an explanatory diagram illustrating video display control information recorded in an MPD file.

An example of XML data in a case in which the video display control information is recorded in the MPD is illustrated in FIG. 18 and is described below.

```
<MPD>
    <Period>
        <AdaptationSet mime-type="video/mp4">
            <Role        schemeIdUri="http://foo.bar/scheme/DefaultProjectionType"
value="1,2,120">
            <Role             schemeIdUri="http://foo.bar/scheme/UserProjectionType"
value="1,4,180">
            <Role             schemeIdUri="http://foo.bar/scheme/UserProjectionType"
value="1,5,180">
            <Role        schemeIdUri="http://foo.bar/scheme/DefaultProjectionType"
value="3,2,120">
            <Role             schemeIdUri="http://foo.bar/scheme/UserProjectionType"
value="3,4,180">
            <Role        schemeIdUri="http://foo.bar/scheme/DefaultProjectionType"
value="3,5,180">
            <Representation>
                <BaseURL> http://foo.bar/ideo.mp4</BaseURL>
            </Representation>
        </AdaptationSet>
        <AdaptationSet mine-type="audio/mp4">
            <AudioChannelConfiguration schemeUri="urn: mpeg: dash: 23003: 3: audio_channel_configuration: 2011" value="2">
            <Representation>
                <BaseURL> http://foo.bar/audio.mp4</BaseURL>
            </Representation>
        </AdaptationSet>
    </Period>
</MPD>
```

As illustrated in FIG. 18, elements (role elements) which are a plurality of recording elements are recorded in the MPD. Each element is an element in which, for example, the display scheme and the display region angle information designated in regard to a specific device type are recorded.

The following setting values are recorded in each element.
In a case in which the setting value is assumed to be:
a setting value (value)=(x, y, z),
x=device type (device_type) 251;
y=designation display scheme (projection_type) 252; and
z=display region diagonal angle (diagonal_angle) 253 are set.

For example, a first element is set as follows:
a setting value (value)=(x, y, z)=(1, 2, 120).
This element records the following designation information.

x=device type (device type)=1:
as understood from the table illustrated in FIG. 8, x=1 is an element that defines the display scheme for the HMD:
a device type setting value=1: an immersive-type head-mounted display (HMD) [an HMD with which only a display video of an HMD display unit can be observed].

y=designation display scheme (projection_type)=2:
as understood from the table illustrated in FIG. 9, y=2 is designation information of the perspective scheme:
a designation display scheme setting value=2: a perspective scheme.

z=display region diagonal angle (diagonal_angle)=120:
this is designation information of the display region diagonal angle applied to the perspective scheme and is designation information in which the display region diagonal angle is set to 120 degrees.

In a case in which the type of display device is an immersive-type head-mounted display (HMD), the HMD applies the perspective scheme, and sets the display region diagonal angle to 180 degrees and executes the display process, in accordance with the element recording information.

Also, in the example of FIG. 18, three elements related to the following setting value are recorded:

a device type setting value=1: an immersive-type head-mounted display (HMD) [an HMD with which only a display video of an HMD display unit can be observed]:
a setting value (value)=(x, y, z)=(1, 2, 120);
a setting value (value)=(x, y, z)=(1, 4, 180); and
a setting value (value)=(x, y, z)=(1, 5, 180).

The three setting values are recorded.
Specific use aspects of the setting values are as follows, for example.

For example, the following value is used in the case of the default display scheme (DefaultProjectionType):
the setting value (value)=(x, y, z)=(1, 2, 120).
In addition, the following values are used in the case of the user display scheme (UserProjectionType):
the setting value (value)=(x, y, z)=(1, 4, 180); and
the setting value (value)=(x, y, z)=(1, 5, 180).

In this way, a case in which the plurality of setting values for the same device type are recorded means that one setting can be freely selected and applied from the settings.

In the case of this example, any setting can be selected and used from the following three settings in the device type setting value=1: the immersive-type head-mounted display (HMD) [an HMD with which only a display video of an HMD display unit can be observed].

(Setting 1)
    y=designation display scheme (projection_type)=2: perspective scheme; and
    z=display region diagonal angle (diagonal_angle)=120.

(Setting 2)
    y=designation display scheme (projection_type)=4: the fish eye (wide angle) display scheme [=the stereographic display scheme]; and
    z=display region diagonal angle (diagonal_angle)=180.

(Setting 3)
    y=designation display scheme (projection_type)=5: the fish eye (wide angle) display scheme [=the equidistant display scheme]; and
    z=display region diagonal angle (diagonal_angle)=180.

Any setting can be selected and used from the foregoing three settings in the device type setting value=1: the immersive-type head-mounted display (HMD) [an HMD with which only a display video of an HMD display unit can be observed].

[6. Video Display Control Process Sequence in which Video Display Control Information Recorded in MPD File is Used]

Next, a video display control process sequence executed by the information processing device, that is, a video display control process sequence in which the video display control information recorded in the MPD file is used, will be described.

The flowcharts illustrated in FIGS. 19 and 20 are explanatory flowcharts illustrating the video display control process sequence executed in the information processing device 70 which is a user device.

The information processing device 70 includes a display unit (display) and an audio output unit (speaker).

The information processing device 70 is, for example, a TV, a PC, a portable terminal, a head-mounted display (HMD), or the like.

The information processing device 70 acquires the MPD file from, for example, the server 50 or the medium 60 illustrated in FIG. 4 and reproduces content recorded in the MPD file.

The reproduced content is content that includes a video in which a multi-directional video such as a celestial video, an omnidirectional video, or a panorama video can be observed and includes audio information which is reproduced along with the video.

Video data and audio data are stored in the MP4 file and control information corresponding to the video data and the audio data are further stored in the MPD file.

The process sequence executed in the information processing device 70 will be described with reference to the flowcharts illustrated in FIGS. 19 and 20.

Also, processes in the flowcharts illustrated in FIGS. 19 and 20 are executed in the information processing device 70. The information processing device 70 includes a data processing unit including a CPU that has a program execution function and each process is executed under the control of the data processing unit. Also, a hardware configuration example of the information processing device 70 will be described later.

A process of each step of the flows illustrated in FIGS. 19 and 20 will be described.

(Step S301)

In step S301, the data processing unit of the information processing device acquires an MPD file.

(Step S302)

Subsequently, in step S302, the data processing unit of the information processing device acquires video display control information from the acquired MPD file.

For example, the video display control information is the video display control information described with reference to FIG. 18.

(Step S303)

Subsequently, in step S303, the data processing unit of the information processing device acquires a video display control information recording element (role element) from the video display control information acquired in step S302.

The video display control information recording element is the role element described with reference to FIG. 18.

As described above with reference to FIG. 18, the plurality of role elements are each recorded in the MPD and are, for example, the elements in which a display scheme and display region angle information designated in a specific device type are recorded.

That is, the following setting values are recorded in each element.

In a case in which the setting value (value)=(x, y, z), the following setting values are recorded:
    x=device type (device_type) 251:
    y=designation display scheme (projection_type) 252; and
    z=display region diagonal angle (diagonal_angle) 253.

The setting values described with reference to FIG. 8 are set in x=device type (device_type) 251. That is, a device type setting value=0: no device designation: available in all devices (in a case in which another value other than 0 is written together, available in devices other than a device corresponding to the setting value written together):

a device type setting value=1: an immersive-type head-mounted display (HMD) [an HMD with which only a display video of an HMD display unit can be observed]:

a device type setting value=2: a glasses-type head-mounted display (HMD) [an HMD with which not only a display video of an HMD display unit but also an outside scenery transmitted through the HMD can be observed]:

a device type setting value=3: a user-screen-manipulation-type device with which a video can be moved by a screen manipulation (a mouse or touch manipulation or the like) by a user [a PC, a tablet terminal, a portable terminal, or the like]; and a device type setting value=4: a user-motion-manipulation-type device in which a video can be moved by a device movement manipulation (a motion manipulation of shaking a device or the like) by a user [a tablet terminal, a portable terminal, or the like].

One value among the values (0 to 4) is set in x=device type (device_type). [0171]

The setting values described with reference to FIG. 9 are set in y=designation display scheme (projection_type). That is, a designation display scheme setting value=0: no designation [a display scheme decided in an information processing device (display device) side can be used];

a designation display scheme setting value=1: a video is displayed without change (no video conversion is executed):

a designation display scheme setting value=2: a perspective scheme:

a designation display scheme setting value=3: a 360° video whole display scheme using two fish eyes:

a designation display scheme setting value=4: a fish eye (wide angle) display scheme [=a stereographic display scheme]:

a designation display scheme setting value=5: a fish eye (wide angle) display scheme [=an equidistant display scheme]:

a designation display scheme setting value=6: a fish eye (wide angle) display scheme [=an equisolid angle display scheme]; and a designation display scheme setting value=7: a fish eye (wide angle) display scheme [=an orthographic display scheme].

One value among the values (0 to 7) is set in y=designation display scheme (projection_type).

In z=display region diagonal angle (diagonal_angle), display region diagonal angles defined in the display scheme (c) 2: the perspective scheme to (h) 7: the fish eye (wide angle) display scheme illustrated in FIG. 8 are recorded. For example, angle information such as 180 or 120 is recorded.

In step S303, the element in which the setting value (x, y, z) is recorded is read.

(Step S304)

Subsequently, in step S304, the data processing unit of the information processing device selects the element in which the device type identifier (x) in the setting value (x, y, z) recorded in each element matches the device type of the own device.

(Step S305)

Subsequently, in step S305, the data processing unit of the information processing device determines whether there is designation of the user display scheme (UserProjectionType) for permitting user selection in regard to the element matching the device type of the own device selected in step S304.

In a case in which there is the designation of the user display scheme (UserProjectionType) for permitting the user selection, the process proceeds to step S401.

In a case in which there is no designation of the user display scheme (UserProjectionType) for permitting the user selection, the process proceeds to step S306.

(Step S306)

In a case of the designation of only the default display scheme (DefaultProjectionType) of the default setting in regard to the element selected in step S304 and matching the device type of the own device, the process of step S306 is executed.

In step S306, the data processing unit of the information processing device acquires the setting value recorded in the element of the default display scheme (DefaultProjectionType), that is, the values of y and z in the setting value (value)=(x, y, z) and executes the video display process in accordance with the acquired data. That is, the video display process is executed in accordance with the following designation of (y) and (z):

(y)=designation display scheme (projection_type); and (z)=display region diagonal angle (diagonal_angle).

(Step S401)

Conversely, in a case in which the number of elements selected in step S304 and matching the device type of the own device is two or more, a process of step S401 is executed.

In step S401, the data processing unit of the information processing device acquires the setting values recorded in the plurality of selected elements, that is, the values of y and z in the setting value (value)=(x, y, z) and displays the values on the display unit. That is, the data processing unit of the information processing device acquires the following data and displays the permission scheme and the permission angle information on the display unit:

(y) the "user selectable display scheme (user_projection_type)"; and (z) the "user selectable display region diagonal angle (user_diagonal_angle)."

That is, a UI for selecting a desired scheme and angle is presented to the user.

Also, at the time of the user selection, both the default display scheme (DefaultProjectionType) and the user display scheme (UserProjectionType) are set to be displayed so that the user can select either scheme.

(Step S402)

Subsequently, the data processing unit of the information processing device inputs input information of the user, that is, the display scheme and the display region angle information desired by the user.

(Step S403)

Subsequently, the data processing unit of the information processing device applies the input information of the user, that is, the scheme and the angle selected in accordance with the display scheme and the display region angle information desired by the user and executes the video display process.

[7. Hardware Configuration Example of Information Processing Device]

Next, a hardware configuration example of the information processing device and the server executing the process according to the above-described embodiments will be described with reference to FIG. 21.

Hardware illustrated in FIG. 21 is an example of a hardware configuration of the information processing device (user device) 70 illustrated in FIGS. 4 and 15, that is, the information processing device (user device) 70 executing video reproduction and audio output.

In addition, the hardware illustrated in FIG. 21 is also an example of a hardware configuration of the server 50 illustrated in FIGS. 4 and 15, that is, the server 50 executing a process of generating a file storing video data, audio data, and the above-described video display control information and transmitting the file to the information processing device (user device) 70.

A central processing unit (CPU) 301 functions as a data processing unit that executes various processes in accordance with programs stored in a read-only memory (ROM) 302 or a storage unit 308. For example, the CPU 301 executes the processes in accordance with the sequences described in the above-described embodiments. A random access memory (RAM) 303 stores data or a program executed by the CPU 301. The CPU 301, the ROM 302, and the RAM 303 are connected to each other by a bus 304.

The CPU 301 is connected to an input and output interface 305 via the bus 304. An input unit 306 including any of various switches, a keyboard, a mouse, a microphone, or the like, a display unit 307 including a display, a speaker, or the like, and an audio output unit 321 are connected to the input and output interface 305. The CPU 301 executes various processes in response to instructions input from the input unit 306 and outputs processing results to, for example, the display unit 307 and the audio output unit 321.

The storage unit 308 connected to the input and output interface 305 includes, for example, a hard disk and stores various kinds of data or programs executed by the CPU 301. The communication unit 309 functions as a transceiver unit for data communication via a network such as the Internet or a local area network and further functions as a transceiver unit for broadcast waves to communicate with an external device.

A drive 310 connected to the input and output interface 305 drives a removable medium 311 such as a magnetic disk, an optical disc, a magneto-optical disc, or a semiconductor memory such as a memory card to execute data recording or reading.

Also, data encoding or decoding can be executed as a process of the CPU 301 serving as the data processing unit, but a codec serving as dedicated hardware for executing an encoding process or a decoding process may be included.

[8. Summary of Configuration of Present Disclosure]

The foregoing thus provides a detailed explanation of embodiments of the present disclosure with reference to specific embodiments. However, it is obvious that persons skilled in the art may make modifications and substitutions to these embodiments without departing from the gist of the present disclosure. In other words, the present disclosure has been disclosed by way of example, and should not be interpreted in a limited manner. The gist of the present disclosure should be determined in consideration of the claims.

Additionally, the present technology may also be configured as below.

(1)

An information processing device including:

a display unit configured to be able to selectively display a multi-directional video; and a data processing unit configured to execute video display control on a video to be output to the display unit, in which the data processing unit acquires video display control information regarding output video data, applies a video display scheme recorded in the video display control information, and executes a video display process.

(2)

The information processing device according to (1), in which the video display control information is information defining a type-based display scheme corresponding to each type of information processing device that executes the video display process, and the data processing unit applies the type-based display scheme of a type matching the type of the own device and executes the video display process.

(3)

The information processing device according to (1) or (2).

in which the video display control information includes at least designation information of one of a perspective scheme and a fish eye (wide angle) display scheme as a video display scheme, and the data processing unit applies a display scheme in accordance with the designation information and executes the video display process.

(4)

The information processing device according to any one of (1) to (3), in which the video display control information includes designation information of one of the following display schemes as a video display scheme:

a fish eye (wide angle) display scheme of a stereographic scheme;

a fish eye (wide angle) display scheme of an equidistant scheme:

a fish eye (wide angle) display scheme of an equisolid scheme; and a fish eye (wide angle) display scheme of an orthographic scheme, and the data processing unit applies the display scheme in accordance with the designation information and executes the video display process.

(5)

The information processing device according to any one of (1) to (4), in which the video display control information includes video display region diagonal angle information, and the data processing unit decides a display region diagonal angle in accordance with the video display region diagonal angle information recorded in the video display control information and executes the video display process.

(6)

The information processing device according to any one of (1) to (5), in which the video display control information includes recording information regarding a user-selectable video display scheme, and the data processing unit displays the user-selectable video display scheme on the display unit, and applies a selected display scheme in accordance with an input of user selection information and executes the video display process.

(7)

The information processing device according to any one of (1) to (6).

in which the video display control information includes recording information regarding user-selectable video display region diagonal angle information, and the data processing unit displays the user-selectable video display region diagonal angle information on the display unit, and applies a selected video display region diagonal angle in accordance with an input of user selection information and executes the video display process.

(8)

The information processing device according to any one of (1) to (7), in which the video display control information is stored in an MP4 file, and the data processing unit acquires the video display control information regarding the output video data from the MP4 file and executes the video display process in accordance with the video display control information acquired from the MP4 file.

(9)

The information processing device according to (8), in which the video display control information is stored in a trak box of the MP4 file, and the data processing unit acquires the video display control information regarding the output video data from the trak box of the MP4 file.

(10)

The information processing device according to any one of (1) to (7).

in which the video display control information is stored in a media presentation description (MPD) file, and the data processing unit acquires the video display control information regarding the output video data from the MPD file and executes the video display process in accordance with the video display control information acquired from the MPD file.

(11)

The information processing device according to (10), in which the video display control information is recorded as device-type-based information in video display control information recording elements set in the media representation description (MPD) file, and the data processing unit selects an element in which device type information matching a device type of the own device is recorded from the video display control information recording elements of the MPD file, and applies a video display scheme recorded in the selected element and executes the video display process.

(12)

A data delivery server including:

a data processing unit configured to generate a file that stores video data configured so that a multi-directional video is selectably displayable and video display control information which is video display control information regarding the video data and defines a video display scheme in accordance with a device type that executes video display; and a communication unit configured to transmit the file generated by the data processing unit.

(13)

An information recording medium storing video data configured so that a multi-directional video is selectably displayable, and video display control information which is video display control information regarding the video data and defines a video display scheme in accordance with a device type that executes video display, in which the information recording medium is configured to be able to cause a reproduction device that reproduces data read from the information recording medium to apply the video display scheme corresponding to the device type matching the type of the own device recorded in the video display control information and execute the video display.

(14)

An information processing method of executing video display control in an information processing device, in which the information processing device includes a display unit configured to be able to selectively display a multi-directional video, and a data processing unit configured to execute the video display control on a video to be output to the display unit, and the data processing unit acquires video display control information regarding output video data, applies a video display scheme recorded in the video display control information, and executes a video display process.

(15)

A program causing an information processing device to execute video display control, in which the information processing device includes a display unit configured to be able to selectively display a multi-directional video, and a data processing unit configured to execute the video display control on a video to be output to the display unit, and the program causes the data processing unit to acquire video display control information regarding output video data, apply a video display scheme recorded in the video display control information, and execute a video display process.

In addition, the series of processes described in this specification can be executed by hardware, software, or a combination configuration of the hardware and the software. In a case in which a process is executed by software, a program that records a process sequence can be installed in a memory of a computer embedded in dedicated hardware to be executed or a program can be installed in a general-purpose computer capable of executing various processes to be executed. For example, the program can be recorded in advance on a recording medium. In addition to the installation on a computer from a recording medium, the program can also be received via a network such as a Local Area Network (LAN) or the Internet and can be installed on a recording medium such as a built-in hard disk.

Also, various processes described in this specification may be executed chronologically as described above and may also be executed in parallel or individually according to a processing capability of a device executing the processes or as necessary. Note that in this specification, the term "system" refers to a logical aggregate configuration of multiple devices, and the respective devices of the configuration are not limited to being inside the same housing.

INDUSTRIAL APPLICABILITY

As described above, in a configuration according to an embodiment of the present disclosure, it is possible to realize a device and a method capable of applying an optimum display scheme corresponding to a display device and executing a display process at the time of a panorama video display process.

Specifically, in an information processing device including a display unit that is able to selectively display a multi-directional video and a data processing unit that executes video display control, the data processing unit applies a device-correspondent video display scheme recorded in video display control information and executes the video display process. The video display control information defines a type-based display scheme optimum for each type of information processing device executing a video display process. The data processing unit applies the display scheme associated with a type matching the type of the own device and executes the video display process.

With this configuration, it is possible to realize a device and a method capable of applying an optimum display scheme corresponding to a display device and executing a display process at the time of a panorama video display process.

REFERENCE SIGNS LIST 10 video data
20 portable terminal
25 speaker
30 head-mounted display (HMD)
35 speaker
50 server
51 broadcast server
52 data delivery server
60 medium
70 information processing device
71 TV
72 PC
73 portable terminal
74 head-mounted display (HMD)
81 MP4 file
82 MPD file
301 CPU
302 ROM
303 RAM
304 bus
305 input and output interface
306 input unit
307 display unit
308 storage unit 309 communication unit
310 drive
311 removable medium
321 audio output unit

The invention claimed is:

1. An information processing device comprising:
a display configured to be able to selectively display a multi-directional video; and
a data processing unit configured to execute video display control on a video to be output to the display,
wherein the data processing unit acquires video display control information regarding output video data, applies a video display scheme recorded in the video display control information, and executes a video display process,
wherein the video display control information includes designation information of a display scheme for converting a shot video into the multi-directional video using a central point of a virtual spherical surface as a reference point, and
wherein the data processing unit is implemented via at least one processor.

2. The information processing device according to claim 1,
wherein the video display control information includes information defining a type-based display scheme corresponding to each type of information processing device that executes the video display process, and
the data processing unit applies the type-based display scheme of a type matching the type of the information processing device and executes the video display process.

3. The information processing device according to claim 1,
wherein the video display control information includes at least designation information of at least one of a perspective scheme or a fish eye (wide angle) display scheme as a video display scheme, and
the data processing unit applies a display scheme in accordance with the designation information and executes the video display process.

4. The information processing device according to claim 1,
wherein the video display control information includes designation information of at least one of the following display schemes as a video display scheme:
a fish eye (wide angle) display scheme of a stereographic scheme;
a fish eye (wide angle) display scheme of an equidistant scheme;
a fish eye (wide angle) display scheme of an equisolid scheme; or
a fish eye (wide angle) display scheme of an orthographic scheme, and
the data processing unit applies the display scheme in accordance with the designation information and executes the video display process.

5. The information processing device according to claim 1,
wherein the video display control information includes video display region diagonal angle information, and
the data processing unit decides a display region diagonal angle in accordance with the video display region diagonal angle information recorded in the video display control information and executes the video display process.

6. The information processing device according to claim 1,
wherein the video display control information includes recording information regarding a user-selectable video display scheme, and
the data processing unit
displays the user-selectable video display scheme on the display, and
applies a selected display scheme in accordance with an input of user selection information and executes the video display process.

7. The information processing device according to claim 1,
wherein the video display control information includes recording information regarding user-selectable video display region diagonal angle information, and
the data processing unit
displays the user-selectable video display region diagonal angle information on the display, and
applies a selected video display region diagonal angle in accordance with an input of user selection information and executes the video display process.

8. The information processing device according to claim 1,
wherein the video display control information is stored in an MP4 file, and
the data processing unit acquires the video display control information regarding the output video data from the MP4 file and executes the video display process in accordance with the video display control information acquired from the MP4 file.

9. The information processing device according to claim 8,
wherein the video display control information is stored in a trak box of the MP4 file, and
the data processing unit acquires the video display control information regarding the output video data from the trak box of the MP4 file.

10. The information processing device according to claim 1,
wherein the video display control information is stored in a media presentation description (MPD) file, and
the data processing unit acquires the video display control information regarding the output video data from the MPD file and executes the video display process in accordance with the video display control information acquired from the MPD file.

11. The information processing device according to claim 10,
wherein the video display control information is recorded as device-type-based information in video display control information recording elements set in the MPD file, and
the data processing unit selects an element in which device type information matching a device type of the information processing device is recorded from the video display control information recording elements of the MPD file, and applies a video display scheme recorded in the selected element and executes the video display process.

12. A data delivery server comprising:
a data processing unit configured to generate a file that stores video data configured so that a multi-directional video is selectably displayable and video display control information which includes video display control information regarding the video data and defines a video display scheme in accordance with a device type that executes video display; and a communication unit configured to transmit the file generated by the data processing unit, wherein the video display control information includes designation information of a display scheme for converting a shot video into the multi-directional video using a central point of a virtual spherical surface as a reference point, and wherein the data processing unit and the communication unit are each implemented via at least one processor.

13. A non-transitory computer-readable information recording medium storing:

video data configured so that a multi-directional video is selectably displayable; and video display control information which includes video display control information regarding the video data and defines a video display scheme in accordance with a device type that executes video display, wherein the non-transitory computer-readable information recording medium is configured to be able to cause a reproduction device that reproduces data read from the non-transitory computer-readable information recording medium to apply the video display scheme corresponding to the device type matching the device type of the reproduction device recorded in the video display control information and execute the video display, and wherein the video display control information includes designation information of a display scheme for converting a shot video into the multi-directional video using a central point of a virtual spherical surface as a reference point.

14. An information processing method of executing video display control in an information processing device, the method comprising:

selectively displaying a multi-directional video;

executing the video display control on a video to be output to a display;

acquiring video display control information regarding output video data;

applying a video display scheme recorded in the video display control information; and executing a video display process, wherein the video display control information includes designation information of a display scheme for converting a shot video into the multi-directional video using a central point of a virtual spherical surface as a reference point.

15. A non-transitory computer-readable medium having embodied thereon a program, which when executed by a computer causes the computer to execute a method, the method comprising:

selectively displaying a multi-directional video;

executing the video display control on a video to be output to a display;

acquiring video display control information regarding output video data;

applying a video display scheme recorded in the video display control information; and executing a video display process, wherein the video display control information includes designation information of a display scheme for converting a shot video into the multi-directional video using a central point of a virtual spherical surface as a reference point.

* * * * *